United States Patent
Liou et al.

(10) Patent No.: US 10,693,712 B2
(45) Date of Patent: Jun. 23, 2020

(54) METHOD AND APPARATUS FOR CONTROL CHANNEL MONITORING BEHAVIOR IN A WIRELESS COMMUNICATION SYSTEM

(71) Applicant: ASUSTek Computer Inc., Taipei (TW)

(72) Inventors: Jia-Hong Liou, Taipei (TW); Ming-Che Li, Taipei (TW)

(73) Assignee: ASUSTek Computer Inc., Taipei (TW)

( * ) Notice: Subject to any disclaimer, the term of this patent is extended or adjusted under 35 U.S.C. 154(b) by 0 days.

(21) Appl. No.: 16/192,939

(22) Filed: Nov. 16, 2018

(65) Prior Publication Data

US 2019/0158348 A1 May 23, 2019

Related U.S. Application Data

(60) Provisional application No. 62/587,878, filed on Nov. 17, 2017.

(51) Int. Cl.
| | |
|---|---|
| *H04L 12/24* | (2006.01) |
| *H04W 72/12* | (2009.01) |
| *H04W 76/18* | (2018.01) |
| *H04B 7/06* | (2006.01) |
| *H04L 5/00* | (2006.01) |
| *H04W 72/14* | (2009.01) |

(52) U.S. Cl.
CPC ....... *H04L 41/0654* (2013.01); *H04B 7/0617* (2013.01); *H04L 5/0053* (2013.01); *H04L 41/0677* (2013.01); *H04L 41/0816* (2013.01); *H04W 72/1289* (2013.01); *H04W 76/18* (2018.02); *H04L 5/0023* (2013.01); *H04L 5/0048* (2013.01); *H04W 72/14* (2013.01)

(58) Field of Classification Search
CPC ............... H04L 41/0654; H04L 5/0053; H04L 41/0816; H04L 41/0677; H04L 5/0023; H04L 5/0048; H04L 43/16; H04B 7/0617; H04B 10/032; H04B 10/035; H04B 10/038; H04B 10/03; H04W 76/18; H04W 72/1289; H04W 72/14; H04W 76/19; H04J 14/0287; H04J 14/0289; H04J 14/029; H04J 14/0291; H04J 14/0293; H04J 14/0294; H04J 14/0295; H04J 14/0297; H04J 2203/006
See application file for complete search history.

(56) References Cited

U.S. PATENT DOCUMENTS

2018/0302889 A1* 10/2018 Guo ...................... H04L 5/0053
2019/0261244 A1* 8/2019 Jung ................... H04W 36/305

* cited by examiner

*Primary Examiner* — Sharad Rampuria
(74) *Attorney, Agent, or Firm* — Cooper Legal Group, LLC

(57) ABSTRACT

One or more computing devices, systems, and/or methods for performing operations associated with a link failure are provided. For example, a first control region may be received and/or monitored via a first link. The first control region may be associated with a first configuration. A link failure associated with the first link may be determined. Responsive to determining and/or detecting the link failure, a failure recovery request may be transmitted. Responsive to transmitting the failure recovery request, a second control region may be received and/or monitored via a second link. The second control region may be associated with a second configuration. A response may be received in the second control region. Responsive to or after receiving the response, the second control region may be received and/or monitored.

19 Claims, 15 Drawing Sheets

METHOD AND APPARATUS FOR CONTROL CHANNEL MONITORING BEHAVIOR IN A WIRELESS COMMUNICATION SYSTEM

RELATED APPLICATION

This application claims the benefit of U.S. Provisional Application No. 62/587,878, filed Nov. 17, 2017, which is incorporated herein by reference in its entirety.

BACKGROUND

A communication link between wireless nodes, such as between a user equipment (UE) and a base station (BS), may be used to exchange data between the UE and the BS. The UE may determine a link failure associated with the communication link. The UE and/or the BS may need to continue exchanging data after the link failure. However, the UE and/or the BS may have limited and/or changing resources and/or may have limited and/or changing capabilities.

SUMMARY

In accordance with the present disclosure, one or more devices and/or methods for operations associated with a link failure are provided. In an example, a first control region may be received and/or monitored via a first link. The first control region may be associated with a first configuration. A link failure associated with the first link may be determined. Responsive to determining the link failure, a failure recovery request may be transmitted. Responsive to transmitting the failure recovery request, a second control region may be received and/or monitored via a second link. The second control region may be associated with a second configuration. A response may be received in the second control region. Responsive to or after receiving the response, a third control region may be received and/or monitored. The third control region may be associated with the second configuration.

In an example, downlink control information may be transmitted in a first control region to a user equipment (UE) via a first link. The first control region may be associated with a first configuration. A failure recovery request, indicative of a link failure associated with the first link, may be received. The failure recovery request may be transmitted by the UE. Responsive to receiving the failure recovery request, a response may be transmitted in a second control region to the UE via a second link. The second control region may be associated with a second configuration. Responsive to or after transmitting the response, one or more downlink transmissions may be transmitted in a third control region, associated with the second configuration.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodi-
} ments may, for example, take the form of hardware, software, firmware or any combination thereof.

At least a portion of the techniques provided herein may be applied to or implemented in exemplary wireless communication systems and devices described below. In addition, at least a portion of the techniques provided herein is described mainly in the context of the 3GPP architecture reference model. However, it is understood that with the disclosed information, one skilled in the art could easily adapt for use and implement aspects of the disclosure in a 3GPP2 network architecture as well as in other network architectures.

The exemplary wireless communication systems and devices described below may employ a wireless communication system, supporting a broadcast service. Wireless communication systems are widely deployed to provide various types of communication such as voice, data, and so on. These systems may be based on code division multiple access (CDMA), time division multiple access (TDMA), orthogonal frequency division multiple access (OFDMA), 3GPP LTE (Long Term Evolution) wireless access, 3GPP LTE-A (Long Term Evolution Advanced) wireless access, 3GPP2 UMB (Ultra Mobile Broadband), WiMax, 3GPP NR (New Radio), or some other modulation techniques.

Figure 1:
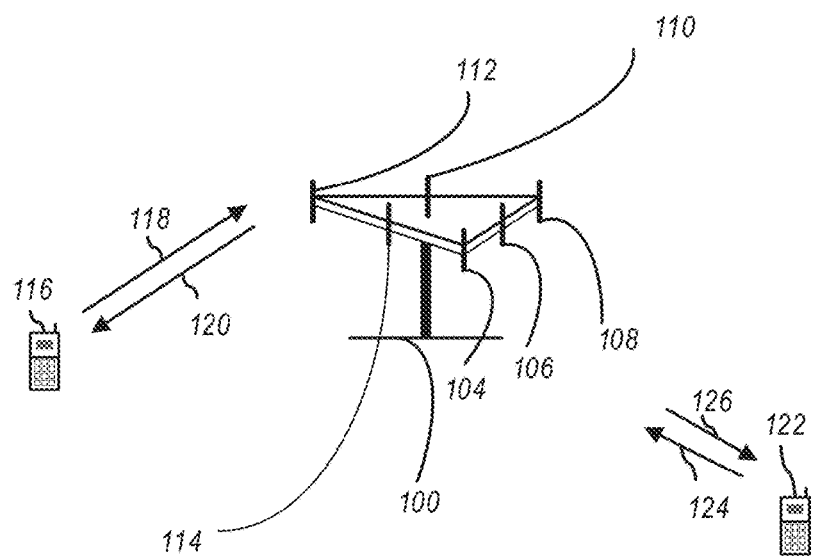
FIG. 1 is an illustration of a scenario involving an example multiple access wireless communication system in accordance with one or more embodiments of the disclosure.

FIG. 1 presents a multiple access wireless communication system in accordance with one or more embodiments of the disclosure. An access network 100 (AN) includes multiple antenna groups, one including 104 and 106, another including 108 and 110, and an additional including 112 and 114. In FIG. 1, only two antennas are shown for each antenna group, however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. AT 122 is in communication with antennas 106 and 108, where antennas 106 and 108 transmit information to AT 122 over forward link 126 and receive information from AT 122 over reverse link 124. In a frequency-division duplexing (FDD) system, communication links 118, 120, 124 and 126 may use different frequencies for communication. For example, forward link 120 may use a different frequency than that used by reverse link 118.

Each group of antennas and/or the area in which they are designed to communicate is often referred to as a sector of the access network. In the embodiment, antenna groups each may be designed to communicate to access terminals in a sector of the areas covered by access network 100.

In communication over forward links 120 and 126, the transmitting antennas of access network 100 may utilize beamforming in order to improve the signal-to-noise ratio of forward links for the different access terminals 116 and 122. Also, an access network using beamforming to transmit to access terminals scattered randomly through its coverage may normally cause less interference to access terminals in neighboring cells than an access network transmitting through a single antenna to all its access terminals.

An access network (AN) may be a fixed station or base station used for communicating with the terminals and may also be referred to as an access point, a Node B, a base station, an enhanced base station, an eNodeB, or some other terminology. An access terminal (AT) may also be called user equipment (UE), a wireless communication device, terminal, access terminal or some other terminology.

Figure 2:
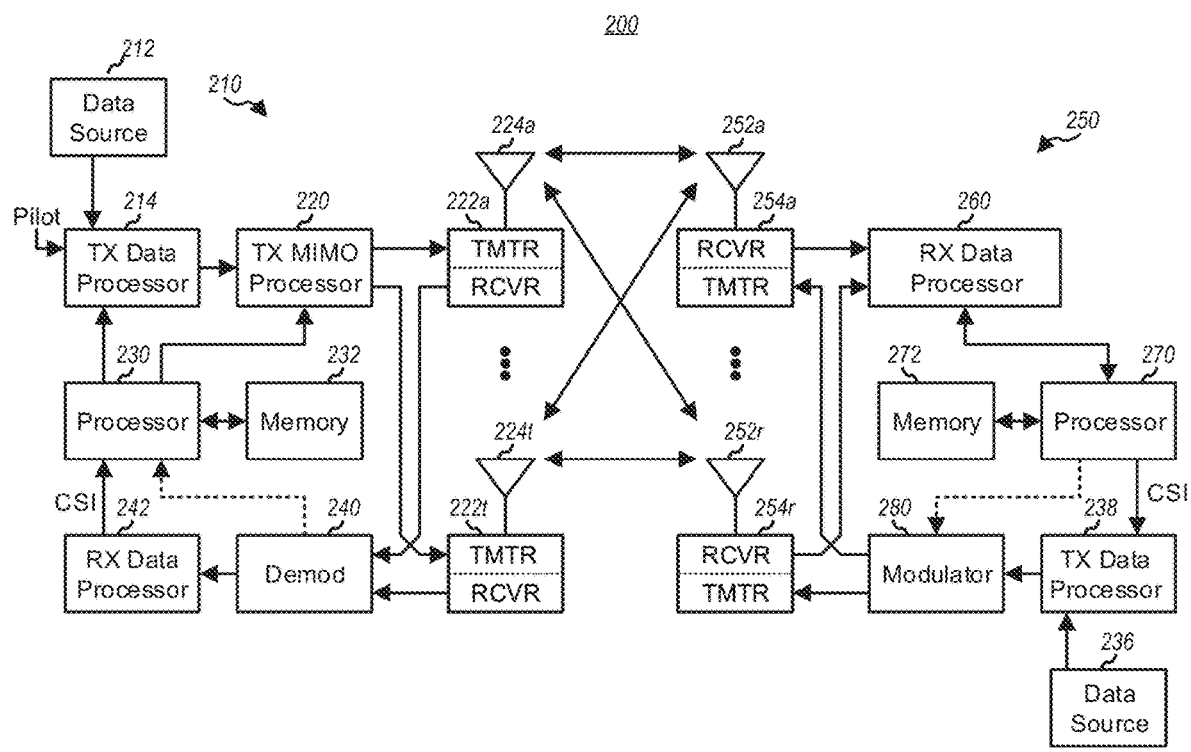
FIG. 2 is an illustration of a scenario involving an example transmitter system and a receiver system in a multiple-input and multiple-output (MIMO) system.

FIG. 2 presents an embodiment of a transmitter system 210 (also known as the access network) and a receiver system 250 (also known as access terminal (AT) or user equipment (UE)) in a multiple-input and multiple-output (MIMO) system 200. At the transmitter system 210, traffic data for a number of data streams may be provided from a data source 212 to a transmit (TX) data processor 214.

In one embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data may typically be a known data pattern that is processed in a known manner and may be used at the receiver system to estimate the channel response. The multiplexed pilot and coded data for each data stream may then be modulated (i.e., symbol mapped) based on a particular modulation scheme (e.g., binary phase shift keying (BPSK), quadrature phase shift keying (QPSK), M-ary phase shift keying (M-PSK), or M-ary quadrature amplitude modulation (M-QAM)) selected for that data stream to provide modulation symbols. The data rate, coding, and/or modulation for each data stream may be determined by instructions performed by processor 230.

The modulation symbols for all data streams may then be provided to a TX MIMO processor 220, which may further process the modulation symbols (e.g., for OFDM). TX MIMO processor 220 may then provide $N_T$ modulation symbol streams to $N_T$ transmitters (TMTR) 222a through 222t. In certain embodiments, TX MIMO processor 220 may apply beamforming weights to the symbols of the data streams and to the antenna from which the symbol is being transmitted.

Each transmitter 222 may receive and/or process a respective symbol stream to provide one or more analog signals, and further conditions (e.g., amplifies, filters, and/or upconverts) the analog signals to provide a modulated signal suitable for transmission over the MIMO channel. $N_T$ modulated signals from transmitters 222a through 222t may then be transmitted from $N_T$ antennas 224a through 224t, respectively.

At receiver system 250, the transmitted modulated signals may be received by NR antennas 252a through 252r and the received signal from each antenna 252 may be provided to a respective receiver (RCVR) 254a through 254r. Each receiver 254 may condition (e.g., filters, amplifies, and/or downconverts) a respective received signal, digitize the conditioned signal to provide samples, and/or further process the samples to provide a corresponding "received" symbol stream.

An RX data processor 260 may then receive and/or process the NR received symbol streams from NR receivers 254 based on a particular receiver processing technique to provide $N_T$ "detected" symbol streams. The RX data processor 260 may then demodulate, deinterleave, and/or decode each detected symbol stream to recover the traffic data for the data stream. The processing by RX data processor 260 may be complementary to that performed by TX MIMO processor 220 and TX data processor 214 at transmitter system 210.

A processor 270 may periodically determine which precoding matrix to use (discussed below). Processor 270 may formulate a reverse link message comprising a matrix index portion and a rank value portion.

The reverse link message may comprise various types of information regarding the communication link and/or the received data stream. The reverse link message may then be processed by a TX data processor 238, which may also receive traffic data for a number of data streams from a data source 236, modulated by a modulator 280, conditioned by transmitters 254a through 254r, and/or transmitted back to transmitter system 210.

At transmitter system 210, the modulated signals from receiver system 250 may be received by antennas 224, conditioned by receivers 222, demodulated by a demodulator 240, and/or processed by a RX data processor 242 to extract the reserve link message transmitted by the receiver system 250. Processor 230 may then determine which precoding matrix to use for determining the beamforming weights and may then process the extracted message.

Memory 232 may be used to temporarily store some buffered/computational data from 240 or 242 through Processor 230, store some buffed data from 212, or store some specific program codes. And Memory 272 may be used to temporarily store some buffered/computational data from 260 through Processor 270, store some buffed data from 236, or store some specific program codes.

Figure 3:
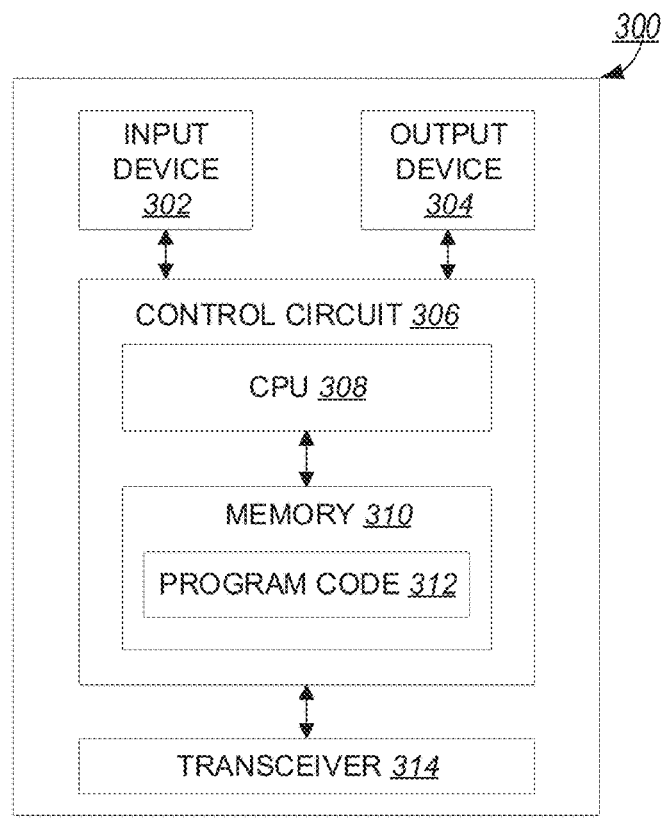
FIG. 3 is an illustration of a scenario involving an example communication device that may utilize and/or implement at least a portion of the techniques presented herein.

FIG. 3 presents a communication device associated with one or more embodiments of the disclosure. As shown in FIG. 3, the communication device 300 in a wireless communication system can be utilized for realizing the UEs (or ATs) 116 and 122 in FIG. 1. The wireless communications system may be the NR system. The communication device 300 may include an input device 302, an output device 304, a control circuit 306, a central processing unit (CPU) 308, a memory 310, a program code 312, and/or a transceiver 314. The control circuit 306 may execute the program code 312 in the memory 310 through the CPU 308, thereby controlling an operation of the communications device 300. The communications device 300 can receive signals input by a user through the input device 302, such as a keyboard or keypad, and can output images and sounds through the output device 304, such as a monitor or speakers. The transceiver 314 may be used to receive and/or transmit wireless signals, deliver received signals to the control circuit 306, and/or output signals generated by the control circuit 306 wirelessly.

Figure 4:
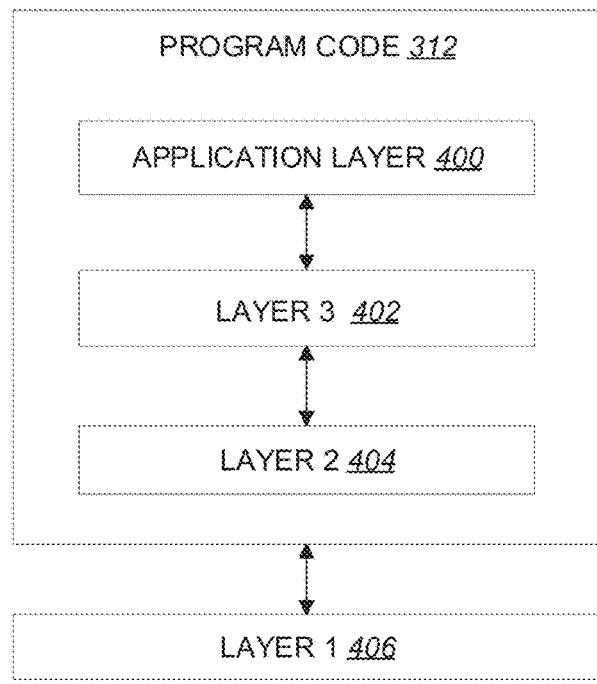
FIG. 4 is an illustration of a scenario involving an example program code in accordance with one or more embodiments of the disclosure.

FIG. 4 presents the program code 312 shown in FIG. 3 in accordance with one or more embodiments of the disclosure. The program code 312 may include an application layer 400, a Layer 3 portion 402, and/or a Layer 2 portion 404, and is coupled to a Layer 1 portion 406. The Layer 3 portion 402 may perform radio resource control. The Layer 2 portion 404 may perform link control. The Layer 1 portion 406 may perform and/or implement physical connections.

For LTE, LTE-A, and/or NR systems, the Layer 2 portion 404 may include a Radio Link Control (RLC) layer and/or a Medium Access Control (MAC) layer. The Layer 3 portion 402 may include a Radio Resource Control (RRC) layer.

Various aspects of the disclosure have been described above. It should be apparent that the teachings herein may be embodied in a wide variety of forms and that any specific structure, function, or both being disclosed herein is merely representative. Based upon the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. As an example of some of the above concepts, in some aspects concurrent channels may be established based on pulse repetition frequencies. In some aspects concurrent channels may be established based on pulse position or offsets. In some aspects concurrent channels may be established based on time hopping sequences. In some aspects concurrent channels may be established based on pulse repetition frequencies, pulse positions or offsets, and time hopping sequences.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

In addition, the various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as random-access memory (RAM), flash memory, read-only memory (ROM), erasable programmable read-only memory (EPROM), electrically erasable programmable read-only memory (EEPROM), registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Figure 5:
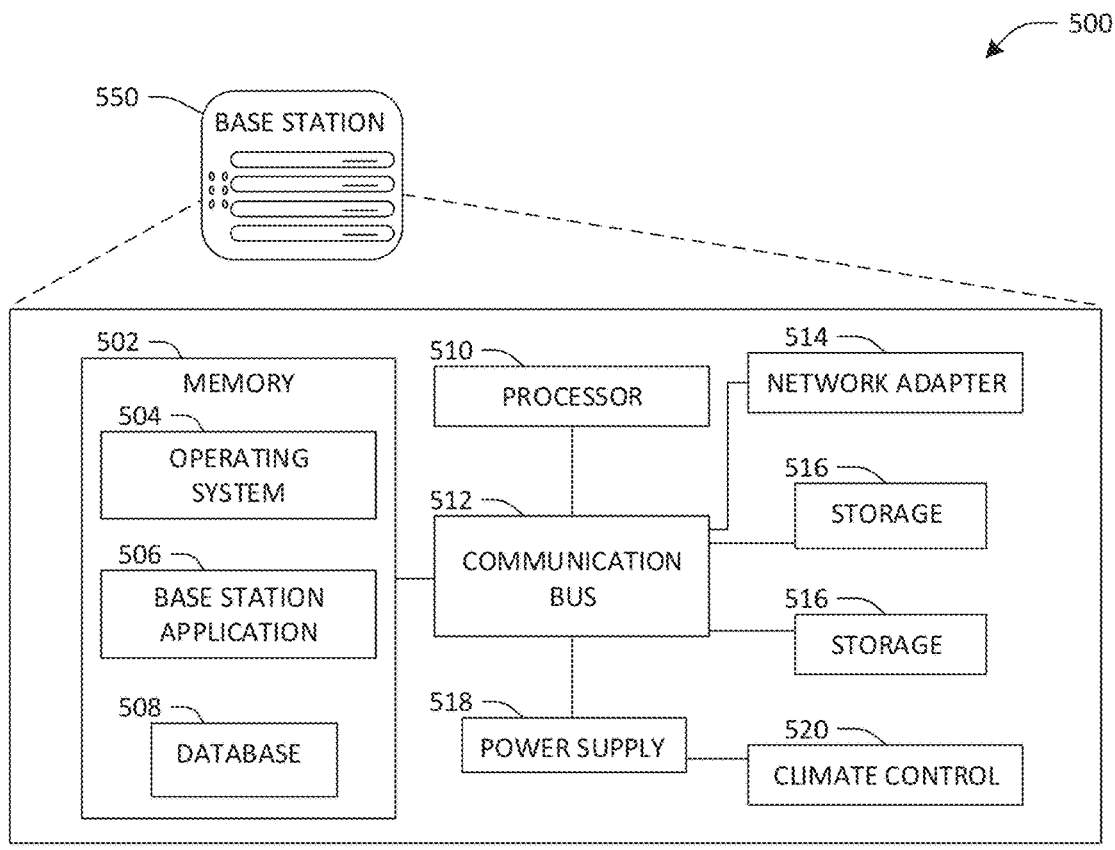
FIG. 5 is an illustration of a scenario involving an example configuration of a base station (BS) that may utilize and/or implement at least a portion of the techniques presented herein

FIG. 5 presents a schematic architecture diagram 500 of a base station (BS) 550 that may utilize at least a portion of the techniques provided herein. Such a BS 550 may vary widely in capabilities and/or configuration, alone or in conjunction with other BSs, end units, nodes and/or servers, etc. in order to provide a service, such as at least some of one or more of the other disclosed techniques, scenarios, etc.

For example, the BS 550 may connect one or more user equipment (UE) to a network (e.g., a wireless and/or wired network which may be connected and/or include one or more other BSs), such as Time Division Multiple Access (TDMA) networks, Code Division Multiple Access (CDMA) networks, Frequency Division Multiple Access (FDMA) networks, Single-Carrier FDMA (SC-FDMA) networks, Orthogonal FDMA (OFDMA) networks, etc. The network may implement a radio technology, such as CDMA2000, Universal Terrestrial Radio Access (UTRA), Evolved UTRA (E-UTRA), Global System for Mobile Communications (GSM), Flash-OFDM, IEEE 802.11, IEEE 802.16, IEEE 802.20, etc. The BS 550 and/or the network may communicate using a standard, such as Long-Term Evolution (LTE).

The BS 550 may comprise a variety of peripheral components, such as a wired and/or wireless network adapter 514 connectible to a local area network and/or wide area network; one or more storage components 516, such as a hard disk drive, a solid-state storage device (SSD), a flash memory device, and/or a magnetic and/or optical disk reader; and/or other peripheral components.

The BS 550 may comprise one or more processors 510 (e.g., hardware processors) that process instructions. The one or more processors 510 may optionally include a plurality of cores; one or more coprocessors, such as a mathematics coprocessor or an integrated graphical processing unit (GPU); and/or one or more layers of local cache memory. The BS 550 may comprise memory 502 storing various forms of applications, such as an operating system 504; one or more BS applications 506; and/or various forms of data, such as a database 508 and/or a file system, etc.

In a multibus scenario, a communication bus 512 may interconnect the BS 550 with at least one other server. Other components that may optionally be included with the BS 550 (though not shown in the schematic diagram 500 of FIG. 5) include a display; a display adapter, such as a graphical processing unit (GPU); input peripherals, such as a keyboard and/or mouse; and/or a flash memory device that may store a basic input/output system (BIOS) routine that facilitates booting the BS 550 to a state of readiness, etc.

The BS 550 may comprise a mainboard featuring one or more communication buses 512 that interconnect the processor 510, the memory 502, and/or various peripherals, using a variety of bus technologies, such as a variant of a serial or parallel AT Attachment (ATA) bus protocol; Small Computer System Interface (SCI) bus protocol; and/or a Uniform Serial Bus (USB) protocol.

The BS 550 may operate within physical enclosures, such as a tower or desktop, and/or may be integrated with a display as an "all-in-one" device. The BS 550 may be mounted horizontally and/or in a cabinet or rack, and/or may simply comprise an interconnected set of components. The BS 550 may comprise a dedicated and/or shared power supply 518 that supplies and/or regulates power for the other components.

The BS 550 may provide power to and/or receive power from another BS and/or server and/or other devices. The BS 550 may comprise a shared and/or dedicated climate control unit 520 that regulates climate properties, such as temperature, airflow, and/or humidity. Many such BSs 550 may be configured and/or adapted to utilize at least a portion of the techniques presented herein.

Figure 6:
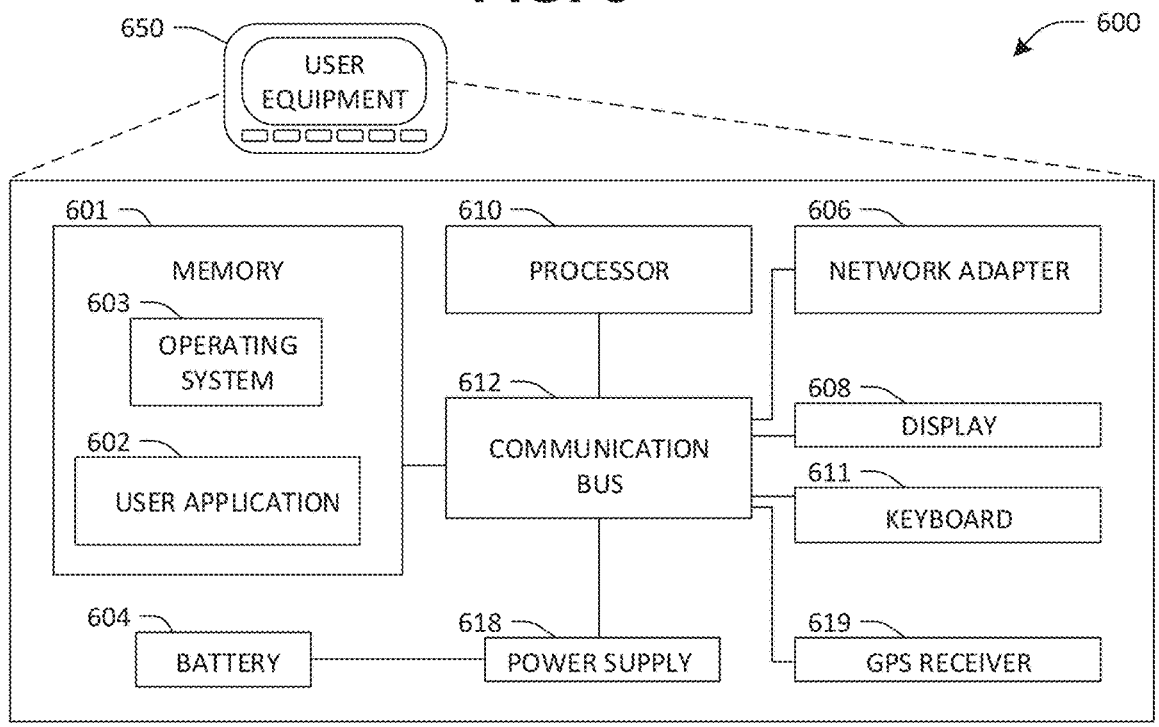
FIG. 6 is an illustration of a scenario involving an example configuration of a user equipment (UE) that may utilize and/or implement at least a portion of the techniques presented herein.

FIG. 6 presents a schematic architecture diagram 600 of a UE 650. At least a portion of the techniques presented herein may be implemented using such a UE 650, which may vary widely in configuration and/or capabilities, in order to provide a variety of functionality to a user.

The UE 650 may comprise one or more processors 610 (e.g., hardware processors) that process instructions. The one or more processors 610 may optionally include a plurality of cores; one or more coprocessors, such as a mathematics coprocessor or an integrated graphical processing unit (GPU); and/or one or more layers of local cache memory.

The UE 650 may comprise memory 601 storing various forms of applications, such as an operating system 603; one or more user applications 602, such as document applications, media applications, file and/or data access applications, communication applications, such as web browsers and/or email clients, utilities, and/or games; and/or drivers for various peripherals.

The UE 650 may be provided in a variety of form factors, such as a mobile phone (e.g., a smartphone); a desktop or tower workstation; an "all-in-one" device integrated with a display 608; tablet, a laptop, convertible tablet, or palmtop device; a wearable device, such as mountable in eyeglass, a headset, wristwatch, and/or earpiece, and/or integrated with an article of clothing; and/or a component of a piece of furniture, such as a tabletop, and/or of another device, such as a vehicle or residence. The UE 650 may serve the user in a variety of roles, such as a telephone, a workstation, kiosk, media player, gaming device, and/or appliance.

The UE 650 may comprise a variety of peripheral components, such as a wired and/or wireless network adapter 606 connectible to a local area network and/or wide area network; one or more output components, such as a display 608 coupled with a display adapter (optionally including a graphical processing unit (GPU)), a sound adapter coupled with a speaker, and/or a printer; input devices for receiving input from the user, such as a keyboard 611, a mouse, a microphone, a camera, and/or a touch-sensitive component of the display 608; and/or environmental sensors, such as a GPS receiver 619 that detects the location, velocity, and/or acceleration of the UE 650, a compass, accelerometer, and/or gyroscope that detects a physical orientation of the UE 650.

Other components that may optionally be included with the UE 650 (though not shown in the schematic architecture diagram 600 of FIG. 6) include one or more storage components, such as a hard disk drive, a solid-state storage device (SSD), a flash memory device, and/or a magnetic and/or optical disk reader; a flash memory device that may store a basic input/output system (BIOS) routine that facilitates booting the UE 650 to a state of readiness; and/or a climate control unit that regulates climate properties, such as temperature, humidity, and airflow, etc.

The UE 650 may comprise a dedicated and/or shared power supply 618 that supplies and/or regulates power for other components, and/or a battery 604 that stores power for use while the UE 650 is not connected to a power source via the power supply 618. The UE 650 may provide power to and/or receive power from other client devices.

The UE 650 may comprise a mainboard featuring one or more communication buses 612 that interconnect the processor 610, the memory 601, and/or various peripherals, using a variety of bus technologies, such as a variant of a serial or parallel AT Attachment (ATA) bus protocol; the Uniform Serial Bus (USB) protocol; and/or the Small Computer System Interface (SCI) bus protocol.

A base station (BS), which may be referred to as a central unit (CU), a nodeB, an evolved NodeB (eNB) and/or gNodeB (gNB), may be a network central unit and/or a network node in a radio access technology (RAT) system, such as a new radio (NR) access technology system. The BS may control one or more transmission and reception points (TRP). Each TRP of the one or more TRPs may be associated with one or more cells. Communications exchanged between the BS and the one or more TRPs may be performed via a fronthaul portion of the RAT system.

A TRP, which may be referred to as a network distributed unit (DU) and/or a network node, may provide network coverage. For example, communication may be exchanged between a plurality of user equipments (UE) and the TRP.

A cell, which may be referred to as a transmission and reception point group (TRPG), may comprise one or more TRPs. For example, a network coverage associated with the cell may be associated with network resources provided to each TRP of the one or more TRPs by a BS. In some examples, the cell may be controlled by the BS.

In some examples, beamforming technology may be used by a network node (e.g., a TRP, a cell, an NR, a BS, a nodeB, an eNB, a gNB, etc.) in order to provide for communications at high-frequency bands (e.g., above 6 GHz). Beamforming may be applied to extend transmission distance by performing directional transmissions (e.g., concentrating transmit signal power in a direction) and/or to reduce interference.

Beam sweeping may be performed in order to cover a plurality of directions for transmission and/or reception of data. For example, a network node may perform a plurality of communications (e.g., transmissions and/or receptions), wherein each communication of the plurality of communications may be performed in a direction of a plurality of directions. Communication may be performed in each direction of the plurality of directions using a beam of a plurality of beams, wherein the beam is directed towards the corresponding direction. In some examples, the network node may not have sufficient capabilities and/or resources to transmit the plurality of beams in the plurality of directions concurrently. Thus, the plurality of communications may be performed sequentially, such that each communication of the plurality of communications may be performed in a time interval of a time period. In some examples, a number of time intervals of the time period may be equal to a number of directions of the plurality of directions and/or a number of beams of the plurality of beams. For example, during the time period, a communication may be performed using each beam of the plurality of beams associated with a direction of the plurality of directions. In some examples, the number of beams of the plurality of beams may be based upon a required number of beams for providing network coverage to an area associated with the network node. Alternatively and/or additionally, the number of beams of the plurality of beams may be related to a necessary number of time intervals to sweep beams in all possible directions once for transmission and/or reception.

In some examples, a serving beam associated with a UE may correspond to a beam, generated by a network node, that is used to communicate with the UE (e.g., at a given time). Alternatively and/or additionally, a candidate beam may be a candidate of a serving beam. Alternatively and/or additionally, a serving beam may be candidate beam. Alternatively and/or additionally, a serving beam may not be candidate beam. Alternatively and/or additionally, a qualified beam may be a beam that has a quality that is greater than a quality threshold. For example, a beam reference signal received power (BRSRP) value of the qualified beam may be greater than a BRSRP threshold. Alternatively and/or additionally, a best serving beam may be a serving beam having a higher quality than other serving beams (e.g., and/or other available beams). For example, a BRSRP value of the best serving beam may be greater than BRSRP values of other serving beams (e.g., any other available serving beams). Alternatively and/or additionally, a worst serving beam may be a serving beam having a lower quality than other serving beams (e.g., and/or other available beams). For example, a BRSRP value of the worst serving beam may be less than BRSRP values of other serving beams (e.g., any other available serving beams).

In some examples, an NR BS using beamforming technology may be stand-alone. For example, a UE may directly camp on or connect to the NR BS. Alternatively and/or additionally, a first NR BS may use beamforming technology and/or a second NR BS may not use beamforming technology. The first NR BS and the second NR BS may be within a cell. Alternatively and/or additionally, the first NR BS and the second NR BS may be within separate cells.

In some examples, beamforming may be applied by a network node (e.g., a TRP) for data transmissions, control information (e.g., control signaling) transmissions, data receptions and/or control information receptions. In some examples, a number of beams concurrently generated by the network node may be associated with capabilities (e.g., a number of antenna elements) of the network node. Alternatively and/or additionally, maximum numbers of beams generated concurrently may be different between different network nodes and/or different TRPs. For example, it may be necessary and/or desired to perform beam sweeping in order to perform communications, such as control signaling, in a plurality of directions. Alternatively and/or additionally, one or more beam combinations may not be generated concurrently by the network node (e.g., when applying hybrid beamforming).

In some examples, downlink timing of a plurality of TRPs associated with a cell may be synchronized (e.g., periodically, manually, etc.). Alternatively and/or additionally, a radio resource control (RRC) layer of network node may be in a BS.

In some examples, the network node may provide support for UEs capable of communication using beamforming and/or UEs incapable of communication using beamforming. Accordingly, first UEs that support beamforming communication and second UEs that do not support beamforming communication may (both) be supported and/or served (e.g., receive network coverage) by the network node.

In some examples, beamforming may be applied by a UE for data transmissions, control information transmissions, data receptions and/or control information receptions. In some examples, a number of beams concurrently generated by the UE may be associated with capabilities of the UE. In some examples, a wideness of beams generated by the UE may be greater and/or wider than a wideness of beams generated by a network node. Alternatively and/or additionally, beam sweeping may be performed by the UE for performing measurements and/or other types of signaling. Alternatively and/or additionally, beam sweeping may not be performed by the UE for data transmission. Alternatively and/or additionally, one or more beam combinations may not be generated concurrently by the UE (e.g., when applying hybrid beamforming).

In some examples, the UE may generate a plurality of beams concurrently. Alternatively and/or additionally, the UE may generate (merely) a single beam at a given time. Alternatively and/or additionally, the UE may be served by a plurality of serving beams (e.g., from one or more TRPs of a cell). Alternatively and/or additionally, the UE may be served by (merely) a single serving beam at a given time.

In some examples, a set of downlink data may be transmitted to the UE using a set of beams. For example, each beam of the set of beams may be used to transmit the set of downlink data to the UE (e.g., for diversity and/or throughput gain). Alternatively and/or additionally, each beam of the set of beams may be used to transmit a portion of the set of downlink data to the UE (e.g., each beam of the set of beams may be used to transmit different portions of the set of downlink data).

Alternatively and/or additionally, a set of uplink data may be transmitted by the UE using a second set of beams. For example, each beam of the second set of beams may be used to transmit the set of uplink data (e.g., for diversity and/or throughput gain). Alternatively and/or additionally, each beam of the second set of beams may be used to transmit a portion of the set of uplink data (e.g., each beam of the second set of beams may be used to transmit different portions of the set of uplink data).

In some examples, the UE may operate in one or more states (e.g., RRC states). For example, the UE may operate in a connected state (e.g., active state, RRC_CONNECTED). While operating in the connected state, the UE may be known by a network and/or an eNB (e.g., and/or a gNB). Alternatively and/or additionally, while operating in the connected state, data may be exchanged between the UE and the network node. Alternatively and/or additionally, the UE may operate in a non-connected state (e.g., idle state, RRC_IDLE). While operating in the non-connected state, the UE may not be known by an eNB (e.g., and/or a gNB) and/or may not be known by a network. Alternatively and/or additionally, the UE may operate in an inactive state. For example, while operating in the inactive state, the UE may not exchange data with the network for a duration of time. In some examples, the inactive state may belong to the connected state. Alternatively and/or additionally, the inactive state may belong to the non-connected state. Alternatively and/or additionally, the inactive state may be separate from the connected state and/or the non-connected state.

In some examples, high-frequency bandwidths (e.g., above 6 GHz) and/or wide bandwidths may be used by a network node (e.g., a TRP, a cell, an NR, a BS, etc.) in order to provide for performing communications at high traffic rates. However, performing communications using the high-frequency bandwidths and/or the wide bandwidths may result in path loss (e.g., and/or propagation loss). Thus, beamforming technology may be adopted in order to use the high-frequency bandwidths and/or the wide bandwidths to provide for performing communications at high traffic rates while improving coverage and/or mitigating path losses.

One or more computing devices and/or techniques for performing operations associated with a link failure (e.g., connection failure) are provided. In an NR system, data may be exchanged between a UE and a network node using one or more links (e.g., one or more connections). For example, the one or more links may comprise one or more beam pair links. The UE and/or the network node may be connected (to each other) using the one or more links. In some examples, due to a change in position, rotation, blockage, etc. associated with the UE and/or the network node, link failure (and/or beam failure) may occur. For example, the link failure may comprise a link (also known as a connection) of the one or more links failing. For example, a quality of the link (e.g., and/or a quality of a channel associated with the link) may decrease (e.g., to less than a threshold quality). Alternatively and/or additionally, when one or more qualities of one or more beam pair link of an associated control channel falls low enough (e.g. comparison with a threshold, time-out of an associated timer), the one or more beam pair links between the UE and the network node are considered to have failed, which is called beam failure.

In some examples, responsive to or after the link failure, one or more operations may be performed. For example, a candidate beam, which may be associated with a second link (e.g., a second connection), may be identified. A failure recovery request (e.g., a beam failure recovery request (BFRQ)) may be transmitted by the UE to the network node. The UE may monitor for a response (e.g., a gNB response), which may be associated with the failure recovery request, from the network node (e.g., a gNB).

In some examples, a first control region (e.g., a control resource set (CORESET)) that may be monitored by the UE prior to the failure recovery request being transmitted may have a first configuration. Alternatively and/or additionally, a second control region (e.g., a CORESET) that may be monitored by the UE after the failure recovery request is transmitted may have a second configuration. For example, the response associated with the failure recovery request may be monitored for and/or received using the second control region. In some examples, the first configuration may be different than the second configuration. Alternatively and/or additionally, the first configuration may be the same as the second configuration.

In some existing techniques, there may not be clarity as to how to conduct monitoring of control regions and/or links after the response is received. For example, after the response is received, it means that the UE-identified candidate beam or the second link is utilizable for communication between the network node and the UE. Transmission and/or reception may be applied on a beam pair link of the UE-identified candidate beam or the second link. However, if the UE still uses the time and frequency resources of the first control region to monitor downlink control signaling after receiving the response, the time and frequency domain resource allocation in the first configuration may not be suitable to directly reuse in the UE-identified candidate beam or the second link, considering a different spatial parameter and/or a different beam domain. In other words, the network node may allocate different time domain resource allocations and/or frequency domain resource allocations on different beams (for different UEs with different serving beam pair links), which may induce some full or partially resource collision/overlapping on control regions between the UE with beam recovered in the UE-identified candidate beam and/or the second link and other UE(s) originally served in the UE-identified candidate beam or the second link. Further, it may also be improper for the UE to keep using the second control region to monitor and/or receive downlink control signaling and/or data transmission from network after beam recovery succeeded or after the response is received, since the second control region is mainly configured to monitor the response. More specifically, the second control region may be utilized mainly for beam recovery, instead of normal data transmission/reception. Accordingly, the exact behavior may be defined to avoid ambiguity in the UE and/or the network. One or more methods, systems and/or techniques to solve one or more of these issues are provided herein.

Figure 7A:
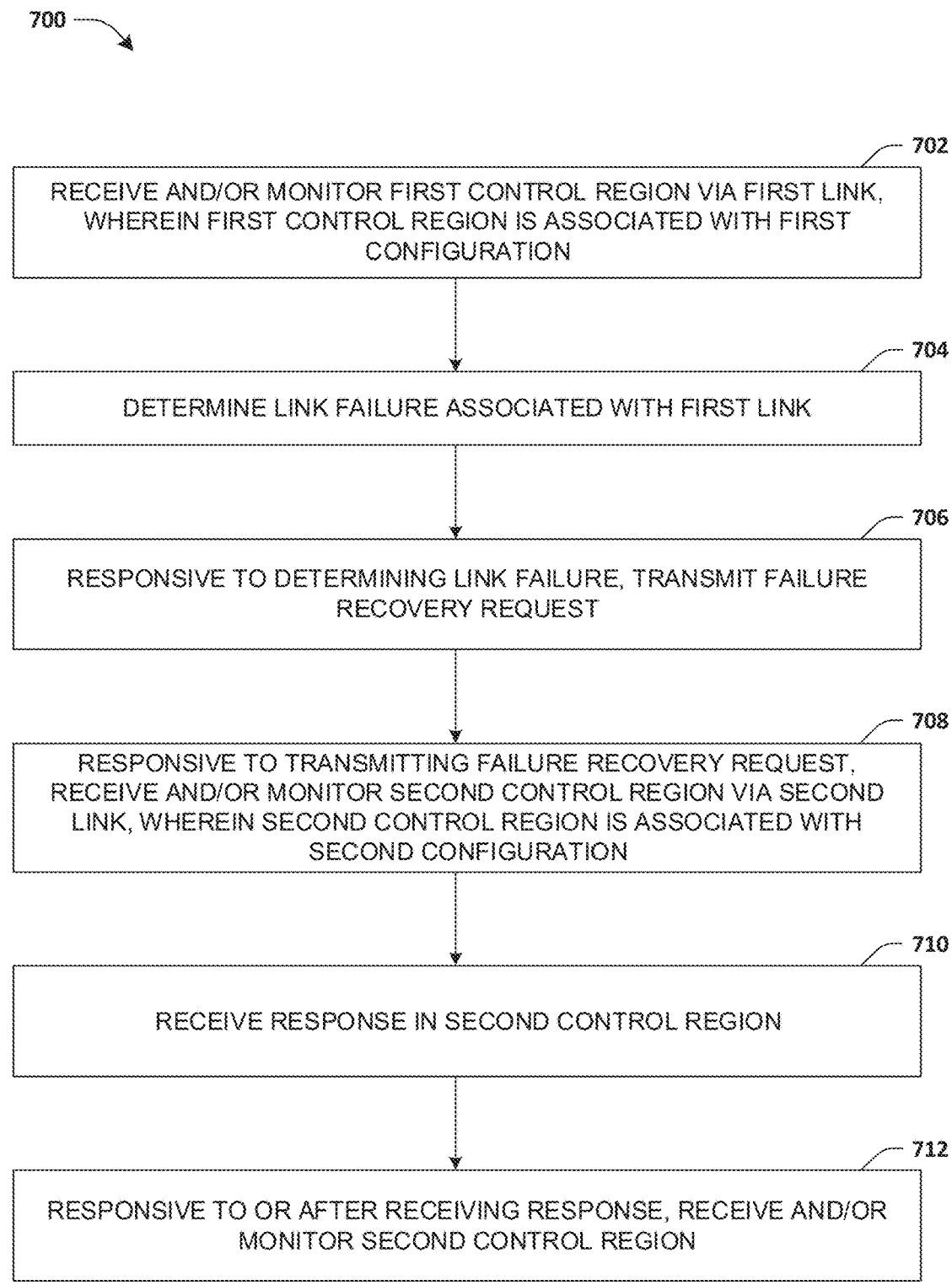
FIG. 7A is a flow chart diagram illustrating an example method for performing operations associated with a link failure.

An example method 700 of performing operations associated with a link failure is illustrated in FIG. 7A. At 702, a first control region may be received and/or monitored via a first link. For example, the first link may be received and/or monitored by a UE from a network node (e.g., a TRP, a cell, an NR, a BS, a nodeB, an eNB, a gNB, etc.). In some examples, the first control region may be associated with a first configuration.

The first control region may comprise a CORESET. Alternatively and/or additionally, the first control region may comprise a search space. The first configuration may correspond to a first set of physical downlink control channel (PDCCH) candidates. Alternatively and/or additionally, the first control region may comprise a set of PDCCH candidates associated with the first set of PDCCH candidates. Alternatively and/or additionally, the first configuration may correspond to a first set of time domain resources and/or a first set of frequency domain resources. Alternatively and/or additionally, the first control region may correspond to a set of time domain resources and/or a set of frequency domain resources associated with the first set of time domain resources and/or the first set of frequency domain resources. In some examples, the first control region may be configured for monitoring downlink control information (e.g., downlink control signaling). For example, the first control region may be configured such that the UE may monitor the downlink control information in the first control region. For example, the downlink control information may be indicative of one or more downlink assignments and/or one or more uplink grants.

The first link may be configured (for the UE) by a higher layer entity. For example, the first link may comprise a radio link (e.g., a radio link for wireless communication between the UE and the network node). Alternatively and/or additionally, the first link may comprise one or more first beams (e.g., one or more downlink beams associated with beamforming technology used for communications between the network node and the UE) comprising a first beam. Alternatively and/or additionally, the first link may comprise one or more first beam pair links (e.g., one or more downlink beam pair links associated with beamforming technology used for communications between the network node and the UE) in a carrier. In some examples, the first link may be a serving beam that is used to communicate with the UE. The first link may comprise any serving beam pair links, in the carrier, that are used to communicate with the UE.

At 704, a link failure associated with the first link may be determined by the UE. For example, one or more serving beam pair links (e.g., and/or all serving beam pair link associated with the UE), that are used for communications between the network node and the UE may fail (e.g., all serving beam pair links used for communications between the network node and the UE may fail). Alternatively and/or additionally, one or more control channels of the one or more serving beam pair links may fail (e.g., all control channels of all serving beam pair links used for communications between the network node and the UE may fail).

For example, the link failure may be detected and/or determined by determining that one or more qualities of one or more control channels fall lower than a quality threshold. For example, the one or more qualities of the one or more control channels may be compared with the quality threshold. Alternatively and/or additionally, the link failure may be detected and/or determined by determining that one or more qualities of all control channels of all serving beam pair links used for communications between the network node and the UE fall lower than the quality threshold.

Alternatively and/or additionally, the link failure may be detected and/or determined by determining a time-out of a first timer associated with the one or more qualities of the one or more control channels (e.g., all control channels of all serving beam pair links used for communications between the network node and the UE). For example, the link failure may be detected and/or determined responsive to determining that the one or more qualities fall lower than the quality threshold (e.g., the link failure may be detected and/or determined if it is determined that the one or more qualities fall lower than the quality threshold).

In some examples, the one or more qualities of the one or more control channels (e.g., all control channels of all serving beam pair links used for communications between the network node and the UE) may be measured based upon a metric. For example, the quality threshold may be associated with the metric. In some examples, the metric corresponds to signal-to-interference-plus-noise ratio (SINR). For example, the one or more qualities may be SINR values associated with the one or more control channels and/or the quality threshold may comprise a threshold SINR value. Alternatively and/or additionally, the metric corresponds to hypothetical block error rate (BLER). For example, the one or more qualities may be hypothetical BLER values associated with the one or more control channels and/or the quality threshold may comprise a threshold hypothetical BLER value. Alternatively and/or additionally, the metric may correspond to reference signals received power (RSRP). For example, the one or more qualities may be RSRP values associated with the one or more control channels and/or the quality threshold may comprise a threshold RSRP value.

At 706, responsive to or after determining the link failure, a failure recovery request may be transmitted. For example, the failure recovery request may be transmitted by the UE to the network node. In some examples, the failure recovery request may comprise a BFRQ. The failure recovery request may be indicative of a downlink reference signal. For example, the failure recovery request may comprise an identification of the downlink reference signal. Alternatively and/or additionally, the failure recovery request may comprise an index associated with the downlink reference signal. Alternatively and/or additionally, the failure recovery request may comprise an RSRP value corresponding to the downlink reference signal. In some examples, a transmission time unit of the request may be at least one of a slot, a subframe, a symbol, a subslot, a mini-slot, a transmission time interval (TTI), a shortened TTI, etc.

In some examples, the downlink reference signal may be associated with a candidate beam (e.g., the downlink reference signal may be transmitted by the network node using the candidate beam). Alternatively and/or additionally, the candidate beam may be identified (e.g., detected, found, etc.) by the UE based upon a measurement of the downlink reference signal. Alternatively and/or additionally, the failure recovery request may be indicative of the downlink reference signal. In some examples, the candidate beam may be quasi-co-located with the downlink reference signal.

In some examples, the failure recovery request may comprise an identification of the candidate beam. For example, the failure recovery request may comprise a beam index of the candidate beam. In some examples, the UE may expect that the network node uses the candidate beam for transmission of responses and/or downlink transmissions after transmission of the failure recovery request.

In some examples, the candidate beam may be associated with a second link. In some examples, the failure recovery request may be transmitted by the UE to the network node using the second link. For example, the second link may comprise the candidate beam. Alternatively and/or additionally, the second link may comprise the candidate beam spatially quasi-co-located with the downlink reference signal. The second link may be identified by the UE (e.g., based upon the measurement of the downlink reference signal).

The second link may comprise a radio link. Alternatively and/or additionally, the second link may comprise one or more second beams (e.g., comprising the candidate beam). Alternatively and/or additionally, the second link may comprise one or more second beam pair links (e.g., comprising the candidate beam) in a carrier.

At 708, responsive to or after transmitting the failure recovery request, a second control region may be received and/or monitored via the second link. For example, the second control region may be received by the UE from the network node. In some examples, the second control region may be associated with a second configuration. At 710, a response may be received in the second control region. In some examples, the response may comprise a beam failure recovery response. Alternatively and/or additionally, the response may comprise a gNB response associated with the failure recovery request.

The second control region may comprise a CORESET configured for receiving and/or monitoring the response. Alternatively and/or additionally, the second control region may comprise a search space. The second configuration may correspond to a second set of PDCCH candidates. Alternatively and/or additionally, the second control region may comprise a set of PDCCH candidates associated with the second set of PDCCH candidates. Alternatively and/or additionally, the second configuration may comprise a second set of time domain resources and/or a second set of frequency domain resources. Alternatively and/or additionally, the second control region may comprise a set of time domain resources and/or a set of frequency domain resources associated with the second set of time domain resources and/or the second set of frequency domain resources.

In some examples, the UE may receive the response in the second control region within a time window. For example, the response may be monitored for (by the UE) during the time window (e.g., the response may not be monitored for before and/or after the time window). In some examples, there may be a time offset between transmission of the failure recovery request and a starting time unit of the time window. In some examples, the starting time unit associated with the time window may be at least one of a slot, a subframe, a symbol, a subslot, a mini-slot, a TTI, a shortened TTI, etc.

Alternatively and/or additionally, the response may be monitored for (by the UE) using the candidate beam (e.g., indicated by the failure recovery request). In some examples, the response may comprise one or more downlink assignments, one or more uplink grants, report triggering information, etc. In some examples, the second control region may be configured such that the UE may monitor for the response in the second control region. For example, the second control region may be dedicated to the UE (for purposes of monitoring for the response).

Alternatively and/or additionally, the response may be specific to the UE. For example, the response may be scrambled and/or addressed to an identity in a cell. For example, the response may comprise an identification (e.g., cell radio network temporary identifier (C-RNTI)) which may be used to identify the UE. In some examples, the response may comprise downlink control information (DCI). For example, the DCI may be scrambled based upon the C-RNTI.

In some examples, the first configuration (associated with the first control region) may comprise the first set of time domain resources. The first set of time domain resources may be indicative of a first amount of contiguous and/or non-contiguous symbols associated with the first control region (e.g., that are occupied by the first control region). Alternatively and/or additionally, the first configuration may comprise the first set of frequency domain resources. The first set of frequency domain resources may be indicative of an allocation of contiguous and/or non-contiguous resources, physical resource blocks (PRB) and/or resource elements (RE) for the first control region.

Alternatively and/or additionally, the first configuration may comprise a first spatial parameter indicative of quasi-co-location (QCL) associated with the first link. Alternatively and/or additionally, the first spatial parameter may be indicative of a parameter associated with (and/or related to) QCL. Alternatively and/or additionally, the first spatial parameter may be indicative of QCL reference and/or the first set of PDCCH candidates. Alternatively and/or additionally, the first spatial parameter may be indicative of the first beam (e.g., and/or the one or more first beams associated with the first link) on which the first control region is transmitted and/or monitored for. For example, the first beam may be identified based upon the first spatial parameter.

In some examples, the second configuration (associated with the second control region) may comprise the second set of time domain resources. The second set of time domain resources may be indicative of a second amount of contiguous and/or non-contiguous symbols associated with the second control region (e.g., that are occupied by the second control region). In some examples, the second set of time domain resources may be different than the first set of time domain resources. Alternatively and/or additionally, the second set of time domain resources may be the same as the first set of time domain resources.

Alternatively and/or additionally, the second configuration may comprise the second set of frequency domain resources. The second set of frequency domain resources may be indicative of an allocation of contiguous and/or non-contiguous resources, PRBs and/or REs for the second control region. In some examples, the second set of frequency domain resources may be different than the first set of frequency domain resources. Alternatively and/or additionally, the second set of frequency domain resources may be the same as the first set of frequency domain resources.

Alternatively and/or additionally, the second configuration may comprise a second spatial parameter indicative of QCL associated with the second link. Alternatively and/or additionally, the second spatial parameter may be indicative of a parameter associated with (and/or related to) QCL. Alternatively and/or additionally, the second spatial parameter may be indicative of QCL reference and/or the second set of PDCCH candidates. Alternatively and/or additionally, the second spatial parameter may be indicative of the candidate beam (e.g., and/or the one or more second beams associated with the second link) on which the second control region is transmitted and/or monitored for. For example, the candidate beam may be identified based upon the second spatial parameter.

In some examples, the first configuration may comprise the first spatial parameter and the second configuration may comprise the second spatial parameter. Alternatively and/or additionally, the first configuration may not comprise a spatial parameter and the second configuration may not comprise a spatial parameter. Alternatively and/or additionally, the first configuration may comprise the first spatial parameter and the second configuration may not comprise a spatial parameter.

At 712, responsive to or after receiving the response, a third control region may be received and/or monitored by the UE. For example, the third control region may be transmitted by the network node. In some examples, the third control region may be the second control region. In a first embodiment, the third control region may be associated with the second configuration. Alternatively and/or additionally, in the first embodiment, the third control region may be associated with a portion of the second configuration (e.g., the portion of the second configuration may comprise the second set of time domain resources and/or the second set of frequency domain resources).

Responsive to or after receiving the response in the second control region, the third control region may be received and/or monitored based upon the second set of time domain resources and/or the second set of frequency domain resources (and/or the second configuration). For example, the third control region may be associated with the second set of time domain resources and/or the second set of frequency domain resources.

In some examples, responsive to or after receiving the response in the second control region, the first spatial parameter in the first configuration may be discarded and/or ignored. For example, responsive to or after receiving the response, the first spatial parameter and/or the first link may not be used.

Alternatively and/or additionally, responsive to or after receiving the response in the second control region, the third control region may be monitored and/or received based upon the second spatial parameter in the second configuration. Alternatively and/or additionally, responsive to or after receiving the response in the second control region, the second spatial parameter may not be used to monitor and/or receive the third control region.

Alternatively and/or additionally, responsive to or after receiving the response in the second control region, one or more downlink assignments, one or more uplink grants and/or one or more downlink transmissions may be received and/or monitored based upon the second set of time domain resources and/or the second set of frequency domain resources and via the second link.

In some examples, responsive to or after receiving the response in the second control region, the third control region, the one or more downlink assignments, the one or more uplink grants and/or the one or more downlink transmissions may be monitored and/or received using the second link. Alternatively and/or additionally, responsive to or after receiving the response in the second control region, the third control region, the one or more downlink assignments, the one or more uplink grants and/or the one or more downlink transmissions may be monitored and/or received using the candidate beam (associated with the second link).

In some examples, a first reconfiguration message may be received by the UE from the network node. For example, the first reconfiguration message may comprise a third configuration. In some examples, a fourth control region may be associated with the third configuration. The fourth control region may be received by the UE from the network node. Responsive to or after receiving the first reconfiguration message, one or more downlink assignments, one or more uplink grants and/or one or more downlink transmissions may be received and/or monitored in the fourth control region based upon the third configuration (e.g., a third set of time domain resources and/or a third set of frequency domain resources associated with the third configuration). For example, responsive to or after receiving the first reconfiguration message, the second configuration may not be used to monitor and/or receive the third control region (and/or the fourth control region), the one or more downlink assignments, the one or more uplink grants and/or the one or more downlink transmissions.

In a second embodiment, the third control region may be associated with the first configuration. Alternatively and/or additionally, in the second embodiment, the third control region may be associated with a portion of the first configuration (e.g., the portion of the first configuration may comprise the first set of time domain resources and/or the first set of frequency domain resources and may not comprise the first spatial parameter).

Responsive to or after receiving the response in the second control region, the third control region may be received and/or monitored based upon the first set of time domain resources and/or the first set of frequency domain resources (and/or the first configuration). For example, the third control region may be associated with the first set of time domain resources and/or the first set of frequency domain resources.

In some examples, responsive to or after receiving the response in the second control region, the first spatial parameter in the first configuration may be discarded and/or ignored. For example, responsive to or after receiving the response in the second control region, the first spatial parameter and/or the first link may not be used. Rather than using the first link, the second link may be used.

Alternatively and/or additionally, responsive to or after receiving the response in the second control region, the third control region may be monitored and/or received based upon the second spatial parameter in the second configuration. Alternatively and/or additionally, responsive to or after receiving the response in the second control region, the second spatial parameter may not be used to monitor and/or receive the third control region.

Alternatively and/or additionally, responsive to or after receiving the response in the second control region, one or more downlink assignments, one or more uplink grants and/or one or more downlink transmissions may be received and/or monitored based upon the first set of time domain resources and/or the first set of frequency domain resources.

In some examples, responsive to or after receiving the response in the second control region, the third control region, the one or more downlink assignments, the one or more uplink grants and/or the one or more downlink transmissions may be monitored and/or received using the second link. Alternatively and/or additionally, responsive to or after receiving the response in the second control region, the third control region, the one or more downlink assignments, the one or more uplink grants and/or the one or more downlink transmissions may be monitored for and/or received using the candidate beam (associated with the second link).

In some examples, a second reconfiguration message may be received by the UE from the network node. For example, the second reconfiguration message may comprise a fourth configuration. In some examples, a fifth control region may be associated with the fourth configuration. The fifth control region may be received by the UE from the network node. Responsive to or after receiving the second reconfiguration message, one or more downlink assignments, one or more uplink grants and/or one or more downlink transmissions may be monitored and/or received in the fifth control region based upon the fourth configuration (e.g., a fourth set of time domain resources and/or a fourth set of frequency domain resources associated with the fourth configuration). For example, responsive to or after receiving the second reconfiguration message, the second configuration may not be used to monitor and/or receive the third control region (and/or the fifth control region), the one or more downlink assignments, the one or more uplink grants and/or the one or more downlink transmissions.

In a third embodiment, control regions, downlink assignments, uplink grants and/or downlink transmissions may be monitored and/or received based upon the second configuration (and/or the portion of the second configuration) during a duration of time. Responsive to or after completion of the duration of time, control regions, downlink assignments, uplink grants and/or downlink transmissions may be monitored and/or received based upon the first configuration (and/or the portion of the first configuration).

In some examples, the duration of time may start (and/or restart) responsive to or after receiving the response in the second control region. For example, a second timer may be used to determine the completion of the duration of time. In some examples, the duration of time may be configured by a higher layer entity. Alternatively and/or additionally, the duration of time may be associated with the second configuration and/or the third control region.

In some examples, responsive to or after receiving the response in the second control region, the first spatial parameter in the first configuration may be discarded and/or ignored. For example, responsive to or after receiving the response in the second control region, the first spatial parameter and/or the first link may not be used.

During the duration of time, one or more first control regions (comprising the third control region) may be received and/or monitored based upon the second set of time domain resources and/or the second set of frequency domain resources (and/or the second configuration). For example, the one or more first control regions may be associated with the second set of time domain resources and/or the second set of frequency domain resources.

Alternatively and/or additionally, during the duration of time, the second control region may be monitored and/or received based upon the second spatial parameter in the second configuration. Alternatively and/or additionally, during the duration of time, the second spatial parameter may not be used to monitor and/or receive the second control region.

Alternatively and/or additionally, during the duration of time, one or more downlink assignments, one or more uplink grants and/or one or more downlink transmissions from the network node may be monitored and/or received based upon the second set of time domain resources and/or the second set of frequency domain resources.

In some examples, during the duration of time, the second control region, the one or more downlink assignments, the one or more uplink grants and/or the one or more downlink transmissions may be monitored and/or received using the second link. Alternatively and/or additionally, during the duration of time, the second control region, the one or more downlink assignments, the one or more uplink grants and/or the one or more downlink transmissions may be monitored for and/or received using the candidate beam (associated with the second link).

Alternatively and/or additionally, after the duration of time (e.g., responsive to or after the completion of the duration of time), the first control region may be received and/or monitored based upon the first set of time domain resources and/or the first set of frequency domain resources. For example, the first control region may be associated with the first set of time domain resources and/or the first set of frequency domain resources.

Alternatively and/or additionally, after the duration of time, the first second control region may be monitored and/or received based upon the second spatial parameter. Alternatively and/or additionally, after the duration of time, the second spatial parameter may not be used to monitor and/or receive the first control region.

Alternatively and/or additionally, after the duration of time, the first downlink assignment, one or more uplink grants and/or one or more downlink transmissions from the network node may be monitored and/or received based upon the first set of time domain resources and/or the first set of frequency domain resources.

In some examples, after the duration of time, the first second control region, the one or more downlink assignments, the one or more uplink grants and/or the one or more downlink transmissions may be monitored and/or received using the second link. Alternatively and/or additionally, after the duration of time, the first second control region, the one or more downlink assignments, the one or more uplink grants and/or the one or more downlink transmissions may be monitored for and/or received using the candidate beam (associated with the second link).

In some examples, a third reconfiguration message may be received by the UE from the network node during the duration of time. For example, the third reconfiguration message may comprise an indication of a fifth configuration. In some examples, a sixth control region may be associated with the fifth configuration. The sixth control region may be received by the UE from the network node. Responsive to or after receiving the third reconfiguration message, one or more downlink assignments, one or more uplink grants and/or one or more downlink transmissions may be monitored and/or received in the sixth control region based upon the fifth configuration (e.g., a fifth set of time domain resources and/or a fifth set of frequency domain resources associated with the fifth configuration). Alternatively and/or additionally, responsive to or after receiving the third reconfiguration message, the second timer (associated with the duration of time) may be stopped. For example, responsive to or after receiving the third reconfiguration message, the first configuration and/or the second configuration may not be used to monitor and/or receive the third control region (and/or the sixth control region), the one or more downlink assignments, the one or more uplink grants and/or the one or more downlink transmissions.

In a fourth embodiment, the third control region may be associated with a combination of the first configuration and the second configuration. Alternatively and/or additionally, in the fourth embodiment, the third control region may be associated with a combination of the first set of time domain resources, the first set of frequency domain resources, the second set of time domain resources and/or the second set of frequency domain resources.

For example, the third control region may be associated with a sixth set of time domain resources and/or a sixth set of frequency domain resources. In some examples, the sixth set of time domain resources may comprise a combination of the first set of time domain resources and the second set of time domain resources. For example, the sixth set of time domain resources may comprise the first set of time domain resources (of the first configuration and/or the first control region) and/or a portion of the first set of time domain resources. Alternatively and/or additionally, the sixth set of time domain resources may comprise the second set of time domain resources (of the second configuration and/or the second control region) and/or a portion of the second set of time domain resources. For example, the sixth set of time domain resources may comprise the first set of time domain resources and the second set of time domain resources. Alternatively and/or additionally, the sixth set of time domain resources may comprise the portion of the first set of time domain resources and the portion of the second set of time domain resources.

In an example, the first set of time domain resources may correspond to first symbols $\{1^{st}, 2^{nd}\}$ of a slot. Alternatively and/or additionally, the second set of time domain resources may correspond to second symbols $\{2^{nd}, 3^{rd}\}$ of a slot. Thus, if the sixth set of time domain resources comprises the first set of time domain resources and the second set of time domain resources, the sixth set of time domain resources comprises third symbols $\{1^{st}, 2^{nd}, 3^{rd}\}$ of a slot.

In some examples, the sixth set of frequency domain resources may comprise a combination of the first set of frequency domain resources and the second set of frequency domain resources. For example, the sixth set of frequency domain resources may comprise the first set of frequency domain resources and/or a portion of the first set of frequency domain resources. Alternatively and/or additionally, the sixth set of frequency domain resources may comprise the second set of frequency domain resources and/or a portion of the second set of frequency domain resources. For example, the sixth set of frequency domain resources may comprise the first set of frequency domain resources and the second set of frequency domain resources. Alternatively and/or additionally, the sixth set of frequency domain resources may comprise the portion of the first set of frequency domain resources and the portion of the second set of frequency domain resources.

In an example, the first set of frequency domain resources may correspond to first PRBs {#0, #2, #5, #7} of a carrier. Alternatively and/or additionally, the second set of frequency domain resources may correspond to second PRBs {#1, #3, #5, #6} of the carrier. Thus, if the sixth set of frequency domain resources comprises the first set of frequency domain resources and the second set of frequency domain resources, the sixth set of frequency domain resources comprises third PRBs {#0, #1, #2, #3, #5, #6, #7} of the carrier.

In some examples, the third control region may correspond to a third set of PDCCH candidates. In some examples, the third set of PDCCH candidates may comprise a combination of the first set of PDCCH candidates (of the first configuration and/or the first control region) and the second set of PDCCH candidates (of the second configuration and/or the second control region). For example, the third set of PDCCH candidates may comprise the first set of PDCCH candidates and/or a portion of the first set of PDCCH candidates. Alternatively and/or additionally, the third set of PDCCH candidates may comprise the second set of PDCCH candidates and/or a portion of the second set of PDCCH candidates. For example, the third set of PDCCH candidates may comprise the first set of PDCCH candidates and the second set of PDCCH candidates. Alternatively and/or additionally, the third set of PDCCH candidates may comprise the portion of the first set of PDCCH candidates and the portion of the second set of PDCCH candidates.

For example, a first portion of the third set of PDCCH candidates may be associated with the first set of PDCCH candidates. Alternatively and/or additionally, a second portion of the third set of PDCCH candidates may be associated with the second set of PDCCH candidates. Alternatively and/or additionally, a third portion of the third set of PDCCH candidates may be associated with both the first set of PDCCH candidates and the second set of PDCCH candidates.

In some examples, responsive to or after receiving the response in the second control region, the third control region may be received and/or monitored based upon the sixth set of time domain resources, the sixth set of frequency domain resources and/or the third set of PDCCH candidates. For example, the third control region may be associated with the sixth set of time domain resources, the sixth set of frequency domain resources and/or the third set of PDCCH candidates.

In some examples, responsive to or after receiving the response in the second control region, the first spatial parameter in the first configuration may be discarded and/or ignored. For example, responsive to or after receiving the response in the second control region, the first spatial parameter and/or the first link may not be used. Rather than using the first link, the second link may be used.

Alternatively and/or additionally, responsive to or after receiving the response in the second control region, the third control region may be monitored and/or received based upon the second spatial parameter in the second configuration. Alternatively and/or additionally, responsive to or after receiving the response in the second control region, the second spatial parameter may not be used to monitor and/or receive the third control region.

Alternatively and/or additionally, responsive to or after receiving the response in the second control region, one or more downlink assignments, one or more uplink grants and/or one or more downlink transmissions may be monitored and/or received based upon the sixth set of time domain resources and/or the sixth set of frequency domain resources.

In some examples, responsive to or after receiving the response in the second control region, the third control region, the one or more downlink assignments, the one or more uplink grants and/or the one or more downlink transmissions may be monitored and/or received using the second link. Alternatively and/or additionally, responsive to or after receiving the response in the second control region, the third control region, the one or more downlink assignments, the one or more uplink grants and/or the one or more downlink transmissions may be monitored for and/or received using the candidate beam (associated with the second link).

In some examples, a fourth reconfiguration message may be received by the UE from the network node. For example, the fourth reconfiguration message may comprise a seventh configuration. In some examples, a seventh control region may be associated with the seventh configuration. The seventh control region may be received by the UE from the network node. Responsive to or after receiving the fourth reconfiguration message, one or more downlink assignments, one or more uplink grants and/or one or more downlink transmissions may be monitored for and/or received in the seventh control region based upon the seventh configuration (e.g., a seventh set of time domain resources and/or a seventh set of frequency domain resources associated with the seventh configuration). For example, responsive to or after receiving the fourth reconfiguration message, the first configuration and/or the second configuration may not be used to monitor and/or receive the third control region (and/or the seventh control region), the one or more downlink assignments, the one or more uplink grants and/or the one or more downlink transmissions.

In a fifth embodiment, the third control region may be associated with an eighth configuration. Alternatively and/or additionally, in the fifth embodiment, the third control region may be associated with a portion of the eighth configuration (e.g., the portion of the eighth configuration may comprise an eighth set of time domain resources and/or an eighth set of frequency domain resources associated with the eighth configuration).

For example, the response in the second control region may comprise the eighth configuration (e.g., the indication of the eighth configuration may comprise information associated with the eighth configuration). For example, the eighth configuration may comprise the eighth set of time domain resources indicative of a third amount of contiguous and/or non-contiguous symbols associated with the third control region. Alternatively and/or additionally the eighth configuration may comprise the eighth set of frequency domain resources indicative of an allocation of contiguous and/or non-contiguous resources, PRBs and/or REs for the third control region.

Alternatively and/or additionally, the eighth configuration may comprise a third spatial parameter indicative of QCL associated with the second link. Alternatively and/or additionally, the third spatial parameter may be indicative of a parameter associated with (and/or related to) the QCL. Alternatively and/or additionally, the third spatial parameter may be indicative of QCL reference and/or a fourth set of PDCCH candidates. Alternatively and/or additionally, the third spatial parameter may be indicative of the candidate beam (e.g., and/or the one or more second beams associated with the second link) on which the third control region is transmitted and/or monitored for. For example, the candidate beam may be identified based upon the third spatial parameter. Alternatively and/or additionally, the eighth configuration may not comprise the third spatial parameter.

Responsive to or after receiving the response in the second control region, the third control region may be received and/or monitored for based upon the eighth set of time domain resources and/or the eighth set of frequency domain resources (and/or the eighth configuration). For example, the third control region may be associated with the eighth set of time domain resources and/or the eighth set of frequency domain resources.

In some examples, responsive to or after receiving the response in the second control region, the first spatial parameter in the first configuration may be discarded and/or ignored. For example, responsive to or after receiving the response in the second control region, the first spatial parameter and/or the first link may not be used. Rather than using the first link, the second link may be used.

Alternatively and/or additionally, responsive to or after receiving the response in the second control region, the third control region may be monitored and/or received based upon the third spatial parameter (associated with the eighth configuration).

Alternatively and/or additionally, responsive to or after receiving the response in the second control region, one or more downlink assignments, one or more uplink grants and/or one or more downlink transmissions may be monitored and/or received based upon the eighth set of time domain resources and/or the eighth set of frequency domain resources.

In some examples, responsive to or after receiving the response in the second control region, the third control region, the one or more downlink assignments, the one or more uplink grants and/or the one or more downlink transmissions may be monitored and/or received using the second link. Alternatively and/or additionally, responsive to or after receiving the response in the second control region, the third control region, the one or more downlink assignments, the one or more uplink grants and/or the one or more downlink transmissions may be monitored and/or received using the candidate beam (associated with the second link).

In some examples, two or more of the first embodiment, the second embodiment, the third embodiment, the fourth embodiment and/or the fifth embodiment may be implemented together, while in other examples, merely one of the first embodiment, the second embodiment, the third embodiment, the fourth embodiment and/or the fifth embodiment may be implemented.

Figure 7B:
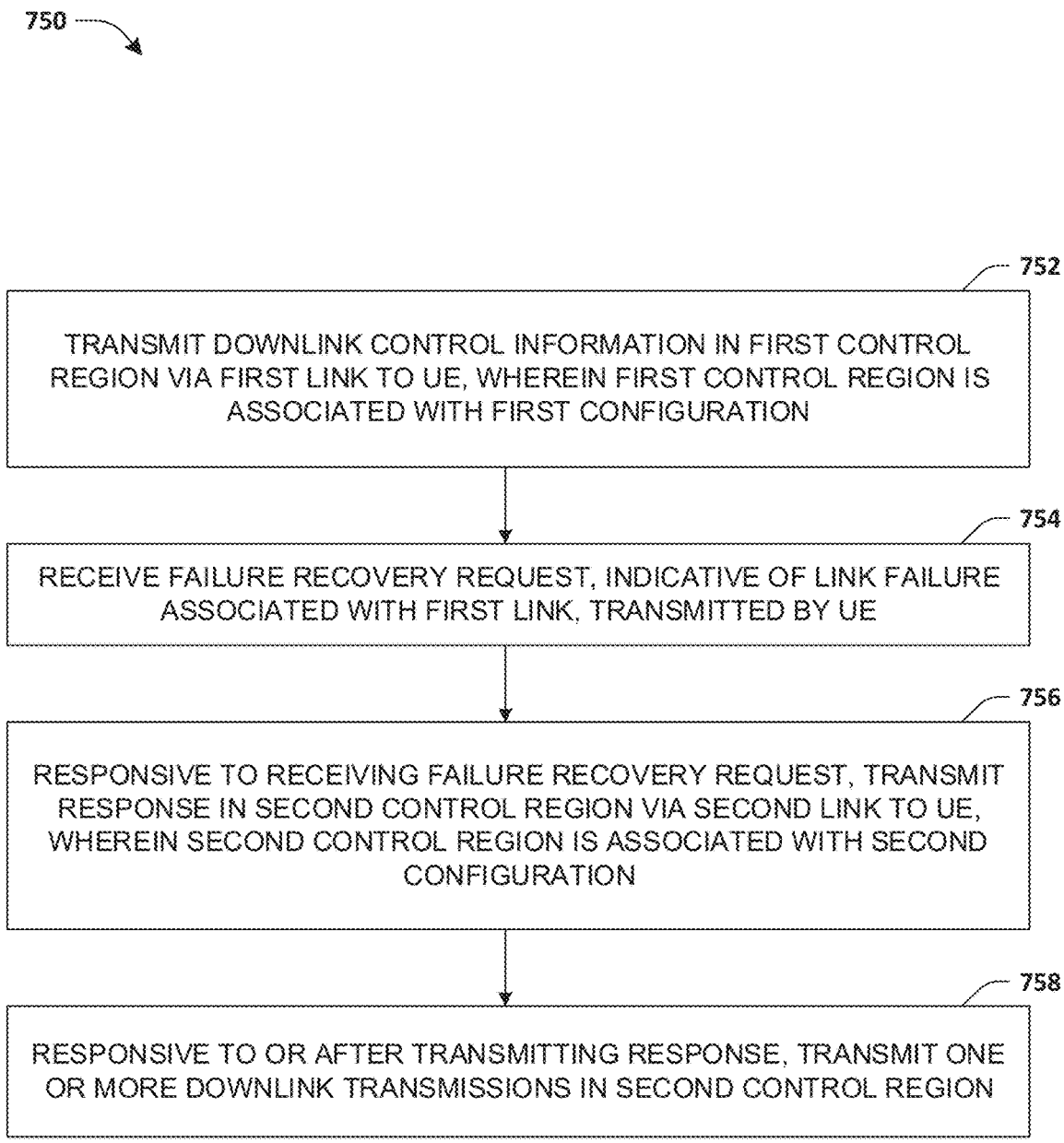
FIG. 7B is a flow chart diagram illustrating an example method for performing operations associated with a link failure.

An example method 750 of performing operations associated with a link failure is illustrated in FIG. 7B. At 752, downlink control information in a first control region may be transmitted via a first link to a UE. For example, the first link may be transmitted by a network node (e.g., a TRP, a cell, an NR, a BS, a nodeB, an eNB, a gNB, etc.) to a UE. In some examples, the first control region may be associated with a first configuration. Alternatively and/or additionally, the first control region may comprise downlink control information (e.g., downlink control signaling).

The first control region may comprise a CORESET. Alternatively and/or additionally, the first control region may comprise a search space. The first configuration may correspond to a first set of PDCCH candidates. Alternatively and/or additionally, the first control region may comprise a set of PDCCH candidates associated with the first set of PDCCH candidates. Alternatively and/or additionally, the first configuration and/or the first control region may correspond to a first set of time domain resources and/or a first set of frequency domain resources. In some examples, the first control region may comprise downlink control information (e.g., downlink control signaling). Alternatively and/or additionally, the first control region may be and/or may comprise a CORESET configured for monitoring downlink control signaling. For example, the downlink control information may be indicative of one or more downlink assignments and/or one or more uplink grants.

The first link may be configured by the network node and/or a higher layer entity. For example, the first link may comprise a radio link. Alternatively and/or additionally, the first link may comprise one or more first beams comprising a first beam. Alternatively and/or additionally, the first link may comprise one or more first beam pair links in a carrier. In some examples, the first link may be a serving beam that is used to communicate with the UE. The first link may comprise any serving beam pair links, of the carrier, that are used to communicate with the UE.

At 754, a failure recovery request, indicative of a link failure associated with the first link, may be received. The failure recovery request may be transmitted by the UE. For example, the failure recovery request may be received by the network node. In some examples, the failure recovery request may comprise a BFRQ. In some examples, the network node may identify a downlink reference signal indicated via the failure recovery request. For example, the failure recovery request may comprise an indication of the downlink reference signal. For example, the failure recovery request may comprise an identification of the downlink reference signal. Alternatively and/or additionally, the failure recovery request may comprise an index associated with the downlink reference signal. In some examples, a transmission time unit of the request may be associated with at least one of a slot, a subframe, a symbol, a subslot, a mini-slot, a TTI, a shortened TTI, etc.

In some examples, the downlink reference signal may be associated with a candidate beam. Alternatively and/or additionally, the candidate beam may be identified (e.g., detected, found, etc.) by the UE based upon a measurement of the downlink reference signal. In some examples, the candidate beam may be quasi-co-located with the downlink reference signal.

In some examples, the failure recovery request may comprise an identification of the candidate beam. For example, the failure recovery request may comprise a beam index of the candidate beam. In some examples, the network node may use the candidate beam for transmission of one or more responses and/or downlink transmissions responsive to or after receiving the failure recovery request.

In some examples, the candidate beam may be associated with a second link. For example, the second link may comprise the candidate beam. Alternatively and/or additionally, the second link may comprise the candidate beam spatially quasi-co-located with the downlink reference signal. The second link may be identified by the UE (e.g., based upon the measurement of the downlink reference signal).

The second link may comprise a radio link. Alternatively and/or additionally, the second link may comprise one or more second beams (e.g., comprising the candidate beam). Alternatively and/or additionally, the second link may comprise one or more second beam pair links (e.g., comprising the candidate beam) on a carrier.

At 756, responsive to or after receiving the failure recovery request, a response in a second control region may be transmitted via a second link to the UE. For example, the second control region may be transmitted by the network node to the UE responsive to or after receiving the failure recovery request. The second control region may be associated with a second configuration. Alternatively and/or additionally, the second control region may comprise a response associated with the failure recovery request. In some examples, the response may comprise a beam failure recovery response. Alternatively and/or additionally, the response may comprise a gNB response.

The second control region may comprise a CORESET. Alternatively and/or additionally, the second control region may comprise a search space. The second configuration may correspond to a second set of PDCCH candidates. Alternatively and/or additionally, the second control region may comprise a set of PDCCH candidates associated with the second set of PDCCH candidates. Alternatively and/or additionally, the second configuration and/or the second control region may correspond to a second set of time domain resources and/or a second set of frequency domain resources. Alternatively and/or additionally, the second control region may be and/or may comprise a CORESET configured for monitoring gNB response after transmitting a beam failure recovery request.

In some examples, the network node may transmit the response and/or the second control region within a time window. For example, the response may be transmitted during the time window (e.g., the response may not be transmitted outside of the time window). In some examples, there may be a time offset between reception of the failure recovery request and a starting time of the time window. In some examples, a starting time unit associated with the time window may be associated with a slot, a subframe, a symbol, a subslot, a mini-slot, a TTI, a shortened TTI, etc.

Alternatively and/or additionally, the response may be transmitted using the candidate beam (e.g., indicated by the failure recovery request). In some examples, the response may comprise one or more downlink assignments, one or more uplink grants, report triggering information, etc. Alternatively and/or additionally, the response is UE-specific. Alternatively and/or additionally, the response is scrambled by or addressed to an identity in a cell. Alternatively and/or additionally, the identity is C-RNTI. Alternatively and/or additionally, the response is a DCI. More specifically, the response is a DCI scrambled by and/or addressed to C-RNTI. Alternatively and/or additionally, after the time window is over, the UE stops monitoring the response.

In some examples, the first configuration (associated with the first control region) may comprise the first set of time domain resources. The first set of time domain resources may be indicative of a first amount of contiguous and/or non-contiguous symbols associated with the first control region (e.g., that are occupied by the first control region).

Alternatively and/or additionally, the first configuration may comprise the first set of frequency domain resources. The first set of frequency domain resources may be indicative of an allocation of contiguous and/or non-contiguous resources, PRBs and/or REs for the first control region.

Alternatively and/or additionally, the first configuration may comprise a first spatial parameter indicative of QCL associated with monitoring and/or receiving the first control region. Alternatively and/or additionally, the first spatial parameter may be indicative of a parameter associated with (and/or related to) QCL for monitoring and/or receiving the first control region. Alternatively and/or additionally, the first spatial parameter may be indicative of a first QCL reference and/or the first set of PDCCH candidates. Alternatively and/or additionally, the first spatial parameter may be indicative of the first beam (e.g., and/or the one or more first beams associated with the first link) on which the first control region is transmitted and/or monitored for. For example, the first beam may be identified based upon the first spatial parameter.

In some examples, the second configuration (associated with the second control region) may comprise the second set of time domain resources. The second set of time domain resources may be indicative of a second amount of contiguous and/or non-contiguous symbols associated with the second control region (e.g., that are occupied by the second control region). In some examples, the second set of time domain resources may be different than the first set of time domain resources. Alternatively and/or additionally, the second set of time domain resources may be the same as the first set of time domain resources.

Alternatively and/or additionally, the second configuration may comprise the second set of frequency domain resources. The second set of frequency domain resources may be indicative of an allocation of contiguous and/or non-contiguous resources, PRBs and/or REs for the second control region. In some examples, the second set of frequency domain resources may be different than the first set of frequency domain resources. Alternatively and/or additionally, the second set of frequency domain resources may be the same as the first set of frequency domain resources.

Alternatively and/or additionally, the second configuration may comprise a second spatial parameter indicative of QCL associated with monitoring and/or receiving the first control region. Alternatively and/or additionally, the second spatial parameter may be indicative of a parameter associated with (and/or related to) QCL for monitoring and/or receiving the first control region. Alternatively and/or additionally, the second spatial parameter may be indicative of a second QCL reference and/or the second set of PDCCH candidates. Alternatively and/or additionally, the second spatial parameter may be indicative of the candidate beam (e.g., and/or the one or more second beams associated with the second link) on which the second control region is transmitted and/or monitored for. For example, the candidate beam may be identified based upon the second spatial parameter.

In some examples, the first configuration may comprise the first spatial parameter and the second configuration may comprise the second spatial parameter. Alternatively and/or additionally, the first configuration may not comprise the first spatial parameter and the second configuration may not comprise the second spatial parameter. Alternatively and/or additionally, the first configuration may comprise the first spatial parameter and the second configuration may not comprise the second spatial parameter. Alternatively and/or additionally, the first configuration may not comprise the first spatial parameter and the second configuration may comprise the second spatial parameter.

At 758, responsive to or after transmitting the response, one or more downlink transmissions may be transmitted in a third control region. In some examples, the third control region may be the second control region. For example, the third control region may be transmitted by the network node to the UE responsive to or after transmitting the second control region (and/or the response in the second control region). Alternatively and/or additionally, the third control region may be transmitted by the network node to the UE responsive to or after receiving an acknowledgement message associated with the second control region and/or the response (from the UE).

In a first embodiment, the third control region may be associated with the second configuration. Alternatively and/or additionally, in the first embodiment, the third control region may be associated with a portion of the second configuration (e.g., the portion of the second configuration may comprise the second set of time domain resources and/or the second set of frequency domain resources).

Responsive to or after transmitting the response (and/or receiving the acknowledgment message), the third control region may be transmitted based upon the second set of time domain resources and/or the second set of frequency domain resources (and/or the second configuration). For example, the third control region may be associated with the second set of time domain resources and/or the second set of frequency domain resources.

Alternatively and/or additionally, responsive to or after transmitting the response, one or more downlink assignments, one or more uplink grants and/or one or more downlink transmissions may be transmitted by the network node based upon the second set of time domain resources and/or the second set of frequency domain resources. For example, the one or more downlink assignments, the one or more uplink grants and/or the one or more downlink transmissions may be transmitted on the second set of time domain resources and/or the second set of frequency domain resources.

In some examples, responsive to or after transmitting the response (and/or receiving the acknowledgment message), the third control region, the one or more downlink assignments, the one or more uplink grants and/or the one or more downlink transmissions may be transmitted via the second link. Alternatively and/or additionally, responsive to or after transmitting the response (and/or receiving the acknowledgment message), the third control region, the one or more downlink assignments, the one or more uplink grants and/or the one or more downlink transmissions may be transmitted using the candidate beam (associated with the second link).

In some examples, a first reconfiguration message may be transmitted to the UE. For example, the first reconfiguration message may comprise an indication of a third configuration. Alternatively and/or additionally, the third configuration indicates and/or comprises a configuration for a fourth control region. Alternatively and/or additionally, the third configuration indicates and/or comprises a configuration for a fourth control region, comprising spatial parameters. Responsive to or after transmitting the first reconfiguration message (and/or receiving a second acknowledgment message associated with the first reconfiguration message), the fourth control region, one or more downlink assignments, one or more uplink grants and/or one or more downlink transmissions may be transmitted based upon the third configuration (e.g., a third set of time domain resources and/or a third set of frequency domain resources associated with the third configuration). Alternatively and/or additionally, responsive to or after receiving the third reconfiguration, the, one or more downlink assignments, one or more uplink grants and/or one or more downlink transmissions may not be transmitted in the third control region. For example, responsive to or after transmitting the first reconfiguration message (and/or receiving the second acknowledgment message), the second configuration may not be used to generate and/or transmit the third control region (and/or the fourth control region), the one or more downlink assignments, the one or more uplink grants and/or the one or more downlink transmissions. Alternatively and/or additionally, the first embodiment may be used for the network node.

In a second embodiment, the third control region may be associated with the first configuration. Alternatively and/or additionally, in the second embodiment, the third control region may be associated with a portion of the first configuration (e.g., the portion of the first configuration may comprise the first set of time domain resources and/or the first set of frequency domain resources).

Responsive to or after transmitting the response (and/or receiving the acknowledgment message), the third control region may be transmitted based upon the first set of time domain resources and/or the first set of frequency domain resources (and/or the first configuration). For example, the third control region may be associated with the first set of time domain resources and/or the first set of frequency domain resources.

Alternatively and/or additionally, responsive to or after transmitting the response (and/or receiving the acknowledgment message), one or more downlink assignments, one or more uplink grants and/or one or more downlink transmissions may be transmitted by the network node based upon the first set of time domain resources and/or the first set of frequency domain resources. For example, the one or more downlink assignments, the one or more uplink grants and/or the one or more downlink transmissions may be associated with the first set of time domain resources and/or the first set of frequency domain resources.

In some examples, responsive to or after transmitting the response (and/or receiving the acknowledgment message), the third control region, the one or more downlink assignments, the one or more uplink grants and/or the one or more downlink transmissions may be transmitted using the second link. Alternatively and/or additionally, responsive to or after transmitting the response (and/or receiving the acknowledgment message), the third control region, the one or more downlink assignments, the one or more uplink grants and/or the one or more downlink transmissions may be transmitted using the candidate beam (associated with the second link).

In some examples, a second reconfiguration message may be transmitted by the network node to the UE. For example, the second reconfiguration message may comprise an indication of a fourth configuration. Alternatively and/or additionally, the fourth configuration indicates and/or comprises a configuration for a fifth control region. Alternatively and/or additionally, the fourth configuration indicates and/or comprises configuration for a fifth control region, comprising spatial parameters. Responsive to or after transmitting the second reconfiguration message (and/or receiving a third acknowledgment message associated with the second reconfiguration message), the fifth control region, one or more downlink assignments, one or more uplink grants and/or one or more downlink transmissions may be transmitted based upon the fourth configuration (e.g., a fourth set of time domain resources and/or a fourth set of frequency domain resources associated with the fourth configuration). Alternatively and/or additionally, responsive to or after receiving the fourth reconfiguration, the one or more downlink assignments, the one or more uplink grants and/or the one or more downlink transmissions may not be transmitted in the third control region. For example, responsive to or after transmitting the second reconfiguration message (and/or receiving the third acknowledgment message), the first configuration may not be used to generate and/or transmit the third control region (and/or the fifth control region), the one or more downlink assignments, the one or more uplink grants and/or the one or more downlink transmissions. Alternatively and/or additionally, the second embodiment may be used for the network node.

In a third embodiment, control regions, downlink assignments, uplink grants and/or downlink transmissions may be transmitted (by the network node) based upon the second configuration (and/or the portion of the second configuration) during a duration of time. Responsive to or after completion of the duration of time, control regions, downlink assignments, uplink grants and/or downlink transmissions may be transmitted based upon the first configuration (and/or the portion of the first configuration).

In some examples, the duration of time may start (and/or restart) responsive to or after transmitting the response (and/or receiving the acknowledgment message). For example, a second timer may be used to determine the completion of the duration of time. In some examples, the duration of time may be configured by the network node and/or a higher layer entity. Alternatively and/or additionally, the duration of time may be associated with the second configuration and/or the second control region.

During the duration of time, the third control region may be transmitted based upon the second set of time domain resources and/or the second set of frequency domain resources (and/or the second configuration). For example, the third control region may be associated with the second set of time domain resources and/or the second set of frequency domain resources.

Alternatively and/or additionally, during the duration of time, one or more first downlink assignments, one or more first uplink grants and/or one or more first downlink transmissions may be transmitted by the network node based upon the second set of time domain resources and/or the second set of frequency domain resources. For example, the one or more first downlink assignments, the one or more first uplink grants and/or the one or more first downlink transmissions may be associated with the second set of time domain resources and/or the second set of frequency domain resources.

In some examples, during the duration of time, the third control region, the one or more first downlink assignments, the one or more first uplink grants and/or the one or more first downlink transmissions may be transmitted using the second link. Alternatively and/or additionally, during the duration of time, the third control region, the one or more first downlink assignments, the one or more first uplink grants and/or the one or more first downlink transmissions may be transmitted using the candidate beam (associated with the second link).

Alternatively and/or additionally, after the duration of time (e.g., responsive to or after the completion of the duration of time), one or more downlink assignments, one or more uplink grants and/or one or more downlink transmissions may be transmitted based upon the first set of time domain resources and/or the first set of frequency domain resources (and/or the first configuration). For example, one or more downlink assignments, one or more uplink grants and/or one or more downlink transmissions may be associated with the first set of time domain resources and/or the first set of frequency domain resources. Alternatively and/or additionally, responsive to or after the completion of the duration of time, the one or more downlink assignments, the one or more uplink grants and/or the one or more downlink transmissions may not be transmitted in the second control region. Alternatively and/or additionally, responsive to or after the completion of the duration of time, the second control region may not be transmitted.

Alternatively and/or additionally, after the duration of time, the one or more second control regions may be transmitted based upon the second spatial parameter (associated with the second configuration). Alternatively and/or additionally, after the duration of time, the second spatial parameter may not be used to generate and/or transmit the one or more second control regions.

Alternatively and/or additionally, after the duration of time, one or more second downlink assignments, one or more second uplink grants and/or one or more second downlink transmissions may be transmitted by the network node based upon the first set of time domain resources and/or the first set of frequency domain resources. For example, the one or more second downlink assignments, the one or more second uplink grants and/or the one or more second downlink transmissions may be associated with the first set of time domain resources and/or the first set of frequency domain resources. Alternatively and/or additionally, after the duration of time, the network node may transmit downlink transmission on the first control region based upon the first configuration. Alternatively, after the duration of time, the network node may transmit downlink transmission on the first control region based upon parameters of the first configuration excluding one or more spatial parameters (e.g., any spatial parameters) that may be comprised within the first configuration.

In some examples, after the duration of time, the one or more second downlink assignments, the one or more second uplink grants and/or the one or more second downlink transmissions may be transmitted using the second link. Alternatively and/or additionally, after the duration of time, the one or more second downlink assignments, the one or more second uplink grants and/or the one or more second downlink transmissions may be transmitted using the candidate beam (associated with the second link).

In some examples, a third reconfiguration message may be transmitted by the network node to the UE during the duration of time. For example, the third reconfiguration message may comprise an indication of a fifth configuration. Alternatively and/or additionally, the fifth configuration indicates and/or comprises a configuration for a sixth control region. Alternatively and/or additionally, the fifth configuration indicates and/or comprises a configuration for a sixth control region, comprising spatial parameters. Responsive to or after transmitting the third reconfiguration message (and/or receiving a fourth acknowledgment message associated with the third reconfiguration message), the third control region (and/or a sixth control region), one or more downlink assignments, one or more uplink grants and/or one or more downlink transmissions may be transmitted based upon the fifth configuration (e.g., a fifth set of time domain resources and/or a fifth set of frequency domain resources associated with the fifth configuration). Alternatively and/or additionally, responsive to or after transmitting the third reconfiguration message (and/or receiving the fourth acknowledgment message), the second timer (associated with the duration of time) may be stopped. For example, responsive to or after transmitting the third reconfiguration message (and/or receiving the fourth acknowledgment message), the first configuration and/or the second configuration may not be used to generate and/or transmit the third control region (and/or the sixth control region), the one or more downlink assignments, the one or more uplink grants and/or the one or more downlink transmissions. Alternatively and/or additionally, the third embodiment may be used for the network node.

In a fourth embodiment, the third control region may be associated with a combination of the first configuration and the second configuration. Alternatively and/or additionally, in the fourth embodiment, the third control region may be associated with a combination of the first set of time domain resources, the first set of frequency domain resources, the second set of time domain resources and/or the second set of frequency domain resources.

For example, the third control region may be associated with a sixth configuration. The sixth configuration may comprise a combination (e.g., united set) of the first configuration and the second configuration. The sixth configuration may be associated with a sixth set of time domain resources and/or a sixth set of frequency domain resources. In some examples, the sixth set of time domain resources may comprise a combination of the first set of time domain resources and the second set of time domain resources. For example, the sixth set of time domain resources may comprise the first set of time domain resources (of the first configuration and/or the first control region) and/or a portion of the first set of time domain resources. Alternatively and/or additionally, the sixth set of time domain resources may comprise the second set of time domain resources (of the second configuration and/or the second control region) and/or a portion of the second set of time domain resources. For example, the sixth set of time domain resources may comprise the first set of time domain resources and the second set of time domain resources. Alternatively and/or additionally, the sixth set of time domain resources may comprise the portion of the first set of time domain resources and the portion of the second set of time domain resources.

In some examples, the sixth set of frequency domain resources may comprise a combination of the first set of frequency domain resources and the second set of frequency domain resources. For example, the sixth set of frequency domain resources may comprise the first set of frequency domain resources and/or a portion of the first set of frequency domain resources. Alternatively and/or additionally, the sixth set of frequency domain resources may comprise the second set of frequency domain resources and/or a portion of the second set of frequency domain resources. For example, the sixth set of frequency domain resources may comprise the first set of frequency domain resources and the second set of frequency domain resources. Alternatively and/or additionally, the sixth set of frequency domain resources may comprise the portion of the first set of frequency domain resources and the portion of the second set of frequency domain resources.

In some examples, the sixth configuration may correspond to a third set of PDCCH candidates. In some examples, the third set of PDCCH candidates may comprise a combination of the first set of PDCCH candidates (of the first configuration and/or the first control region) and the second set of PDCCH candidates (of the second configuration and/or the second control region). For example, the third set of PDCCH candidates may comprise the first set of PDCCH candidates and/or a portion of the first set of PDCCH candidates. Alternatively and/or additionally, the third set of PDCCH candidates may comprise the second set of PDCCH candidates and/or a portion of the second set of PDCCH candidates. For example, the third set of PDCCH candidates may comprise the first set of PDCCH candidates and the second set of PDCCH candidates. Alternatively and/or additionally, the third set of PDCCH candidates may comprise the portion of the first set of PDCCH candidates and the portion of the second set of PDCCH candidates.

In some examples, a first portion of the third set of PDCCH candidates may be associated with the first set of PDCCH candidates. Alternatively and/or additionally, a second portion of the third set of PDCCH candidates may be associated with the second set of PDCCH candidates. Alternatively and/or additionally, a third portion of the third set of PDCCH candidates may be associated with both the first set of PDCCH candidates and the second set of PDCCH candidates.

For example, responsive to or after transmitting the response (and/or receiving the acknowledgment message), the third control region may be transmitted based upon the sixth set of time domain resources, the sixth set of frequency domain resources and/or the third set of PDCCH candidates. For example, the third control region may be associated with the sixth set of time domain resources, the sixth set of frequency domain resources and/or the third set of PDCCH candidates.

In some examples, responsive to or after transmitting the response (and/or receiving the acknowledgment message), the first spatial parameter (associated with the first configuration) may be discarded and/or ignored. For example, responsive to or after transmitting the response (and/or receiving the acknowledgment message), the first spatial parameter and/or the first link may not be used. Rather than using the first link, the second link may be used.

Alternatively and/or additionally, responsive to or after transmitting the response (and/or receiving the acknowledgment message), the third control region may be transmitted based upon the second spatial parameter (associated with the second configuration). Alternatively and/or additionally, responsive to or after transmitting the response (and/or receiving the acknowledgment message), the second spatial parameter may not be used to generate and/or transmit the third control region.

Alternatively and/or additionally, responsive to or after transmitting the response (and/or receiving the acknowledgment message), one or more downlink assignments, one or more uplink grants and/or one or more downlink transmissions may be transmitted by the network node based upon the sixth set of time domain resources and/or the sixth set of frequency domain resources. For example, the one or more downlink assignments, the one or more uplink grants and/or the one or more downlink transmissions may be associated with the sixth set of time domain resources and/or the sixth set of frequency domain resources.

In some examples, responsive to or after transmitting the response (and/or receiving the acknowledgment message), the third control region, the one or more downlink assignments, the one or more uplink grants and/or the one or more downlink transmissions may be transmitted using the second link. Alternatively and/or additionally, responsive to or after transmitting the response (and/or receiving the acknowledgment message), the third control region, the one or more downlink assignments, the one or more uplink grants and/or the one or more downlink transmissions may be transmitted using the candidate beam (associated with the second link).

In some examples, a fourth reconfiguration message may be transmitted by the network node to the UE. For example, the fourth reconfiguration message may comprise an indication of a seventh configuration. Alternatively and/or additionally, the seventh configuration indicates or comprises configuration for a seventh control region. Alternatively and/or additionally, the seventh configuration indicates or comprises configuration for a seventh control region, comprising spatial parameters. Responsive to or after transmitting the fourth reconfiguration message (and/or receiving a fifth acknowledgment message associated with the fourth reconfiguration message), the seventh control region, one or more downlink assignments, one or more uplink grants and/or one or more downlink transmissions may be transmitted based upon the seventh configuration (e.g., a seventh set of time domain resources and/or a seventh set of frequency domain resources associated with the seventh configuration). Alternatively and/or additionally, the fourth embodiment may be used for the network node.

In a fifth embodiment, the third control region may be associated with an eighth configuration. Alternatively and/or additionally, in the fifth embodiment, the third control region may be associated with a portion of the eighth configuration (e.g., the portion of the eighth configuration may comprise an eighth set of time domain resources and/or an eighth set of frequency domain resources associated with the eighth configuration).

For example, the second control region and/or the response in the second control region may comprise an indication of the eighth configuration. For example, the eighth configuration may comprise the eighth set of time domain resources indicative of a third amount of contiguous and/or non-contiguous symbols associated with the third control region. Alternatively and/or additionally the eighth configuration may comprise the eighth set of frequency domain resources indicative of an allocation of contiguous and/or non-contiguous resources, PRBs and/or REs for the third control region.

Alternatively and/or additionally, the eighth configuration may comprise a third spatial parameter. Alternatively and/or additionally, the third spatial parameter is indicative of QCL associated with the second link. Alternatively and/or additionally, the third spatial parameter may be indicative of a parameter associated with (and/or related to) the third QCL. Alternatively and/or additionally, the third spatial parameter may be indicative of a third QCL reference and/or a fourth set of PDCCH candidates. Alternatively and/or additionally, the third spatial parameter may be indicative of the candidate beam (e.g., and/or the one or more second beams associated with the second link) on which the third control region is transmitted. For example, the candidate beam may be identified based upon the third spatial parameter. Alternatively and/or additionally, the eighth configuration may not comprise the third spatial parameter.

Responsive to or after transmitting the response (and/or receiving the acknowledgment message), the third control region may be transmitted based upon the eighth set of time domain resources and/or the eighth set of frequency domain resources (and/or the eighth configuration). For example, the third control region may be associated with the eighth set of time domain resources and/or the eighth set of frequency domain resources.

Alternatively and/or additionally, responsive to or after transmitting the response (and/or receiving the acknowledgment message), the third control region may be transmitted based upon the third spatial parameter (associated with the eighth configuration). Alternatively and/or additionally, responsive to or after transmitting the response (and/or receiving the acknowledgment message), the third spatial parameter may not be used to generate and/or transmit the third control region.

Alternatively and/or additionally, responsive to or after transmitting the response (and/or receiving the acknowledgment message), one or more downlink assignments, one or more uplink grants and/or one or more downlink transmissions may be transmitted by the network node based upon the eighth set of time domain resources and/or the eighth set of frequency domain resources. For example, the one or more downlink assignments, the one or more uplink grants and/or the one or more downlink transmissions may be associated with the eighth set of time domain resources and/or the eighth set of frequency domain resources.

In some examples, responsive to or after transmitting the response (and/or receiving the acknowledgment message), the third control region, the one or more downlink assignments, the one or more uplink grants and/or the one or more downlink transmissions may be transmitted using the second link. Alternatively and/or additionally, responsive to or after transmitting the response (and/or receiving the acknowledgment message), the third control region, the one or more downlink assignments, the one or more uplink grants and/or the one or more downlink transmissions may be transmitted using the candidate beam (associated with the second link). Alternatively and/or additionally, the fifth embodiment may be used for a network node.

In some examples, two or more of the first embodiment, the second embodiment, the third embodiment, the fourth embodiment and/or the fifth embodiment may be implemented together, while in other examples, merely one of the first embodiment, the second embodiment, the third embodiment, the fourth embodiment and/or the fifth embodiment may be implemented.

In some examples, at least some of the disclosed subject matter may be implemented on a UE, and in some examples, at least some of the disclosed subject matter may be implemented on a network node (e.g., a TRP, a cell, an NR, a BS, a nodeB, an eNB, a gNB, etc.).

Alternatively and/or additionally, at least some of the disclosed subject matter may be implemented on a first UE configured using one carrier and/or one cell, and in some examples, at least some of the disclosed subject matter may be implemented on a second UE configured using more than one carriers and/or more than one cells.

It may be appreciated that the disclosed subject matter may not be limited to operations associated with a link failure. For example, at least some of the disclosed subject matter may be applied to UE behavior (e.g., UE monitoring behavior) after a link is recovered, reconnected and/or reconfigured. Alternatively and/or additionally, at least some of the disclosed subject matter may be applied to network behavior after a link is recovered, reconnected and/or reconfigured. Alternatively and/or additionally, the disclosed subject matter may assist a UE and/or a network in recovering, reconnecting and/or reconfiguring links (responsive to or after link failures).

Figure 8:
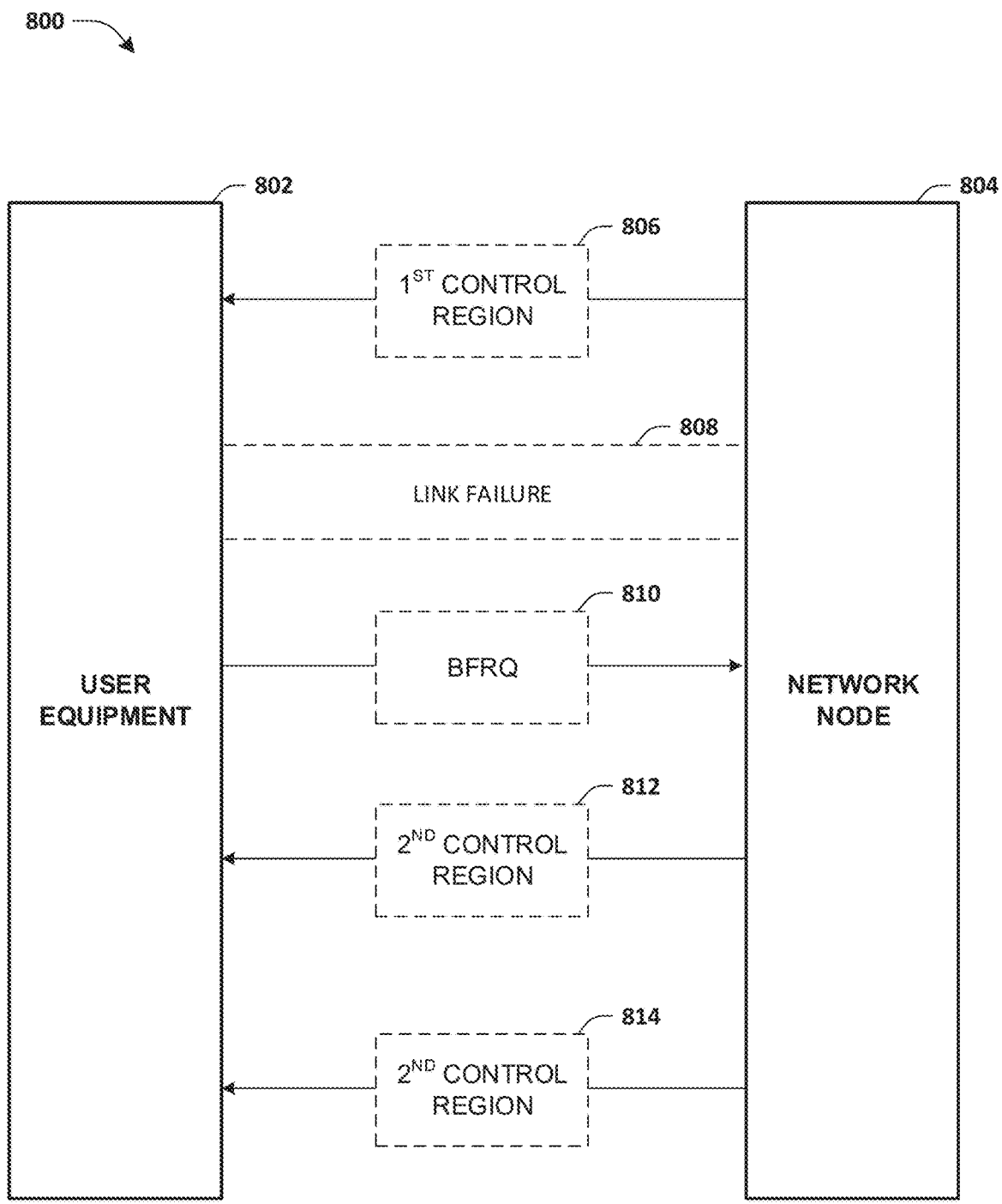
FIG. 8 is a component block diagram illustrating an example system for performing operations associated with a link failure.

FIG. 8 illustrates a system 800 for performing operations associated with a link failure. For example, data may be exchanged between a UE 802 and a network node 804 (e.g., a TRP, a cell, an NR, a BS, a nodeB, an eNB, a gNB, etc.) using a first link (e.g., corresponding to one or more first beams). For example, a first control region 806 (e.g., a CORESET) may be received and/or monitored by the UE 802 from the network node 804 via the first link. The first control region 806 may be associated with a first configuration.

A link failure 808 associated with the first link may be determined by the UE. Responsive to or after determining the link failure, the UE may transmit a failure recovery request 810 (e.g., a BFRQ) to the network node 804. In some examples, the failure recovery request 810 may be indicative of a downlink reference signal. In some examples, the downlink reference signal may be associated with a candidate beam. In some examples, the failure recovery request 810 may be transmitted by the UE 802 to the BS 804 using a second link associated with the candidate beam.

In some examples, a response (e.g., a beam failure recovery response) may be transmitted in a second control region 812 \by the network node 804 to the UE 802 via the second link. In some examples, the second control region 812 may be associated with a second configuration. For example, a first set of time domain resources and/or a first set of frequency domain resources of the first configuration may be different than a second set of time domain resources and/or a second set of frequency domain resources of the second configuration.

In some examples, one or more downlink transmissions may be transmitted in a third control region 814 by the network node 804 to the UE 802 via the second link. In some examples, the third control region 814 may be the second control region 812. In a first embodiment, the third control region 814 may be associated with the second configuration. For example, the third control region 814 may be monitored and/or received by the UE 802 based upon the second set of time domain resources and/or the second set of frequency domain resources. In a second embodiment, the third control region may be associated with the first configuration. For example, the third control region 814 may be monitored and/or received by the UE 802 based upon the first set of time domain resources and/or the first set of frequency domain resources.

In a third embodiment, control regions (e.g., comprising the third control region 814), downlink assignments, uplink grants and/or downlink transmissions associated with the second configuration may be transmitted by the network node 804 to the UE 802 for a duration of time. Responsive to or after completion of the duration of time, control regions, downlink assignments, uplink grants and/or downlink transmissions associated with the first configuration may be transmitted by the network node 804 to the UE 802. For example, during the duration of time, control regions, downlink assignments, uplink grants and/or downlink transmissions may be monitored and/or received by the UE 802 based upon the second set of time domain resources and/or the second set of frequency domain resources. After the duration of time, control regions, downlink assignments, uplink grants and/or downlink transmissions may be monitored and/or received by the UE 802 based upon the first set of time domain resources and/or the first set of frequency domain resources.

In a fourth embodiment, the third control region 814 may be associated with a combination of the first configuration and the second configuration. For example, the third control region 814 may be monitored and/or received by the UE 802 based upon a third set of time domain resources (e.g., comprising a combination of the first set of time domain resources and the second set of time domain resources) and/or a third set of frequency domain resources (e.g., comprising a combination of the first set of frequency domain resources and the second set of frequency domain resources).

In a fifth embodiment, the third control region 814 may be associated with a fourth configuration. For example, the third control region 814 may be monitored and/or received by the UE 802 based upon a fourth set of time domain resources and/or a fourth set of frequency domain resources of the fourth configuration. In some examples, the second control region 812 and/or the response in the second control region 812 may comprise an indication of the fourth configuration.

Figure 9:
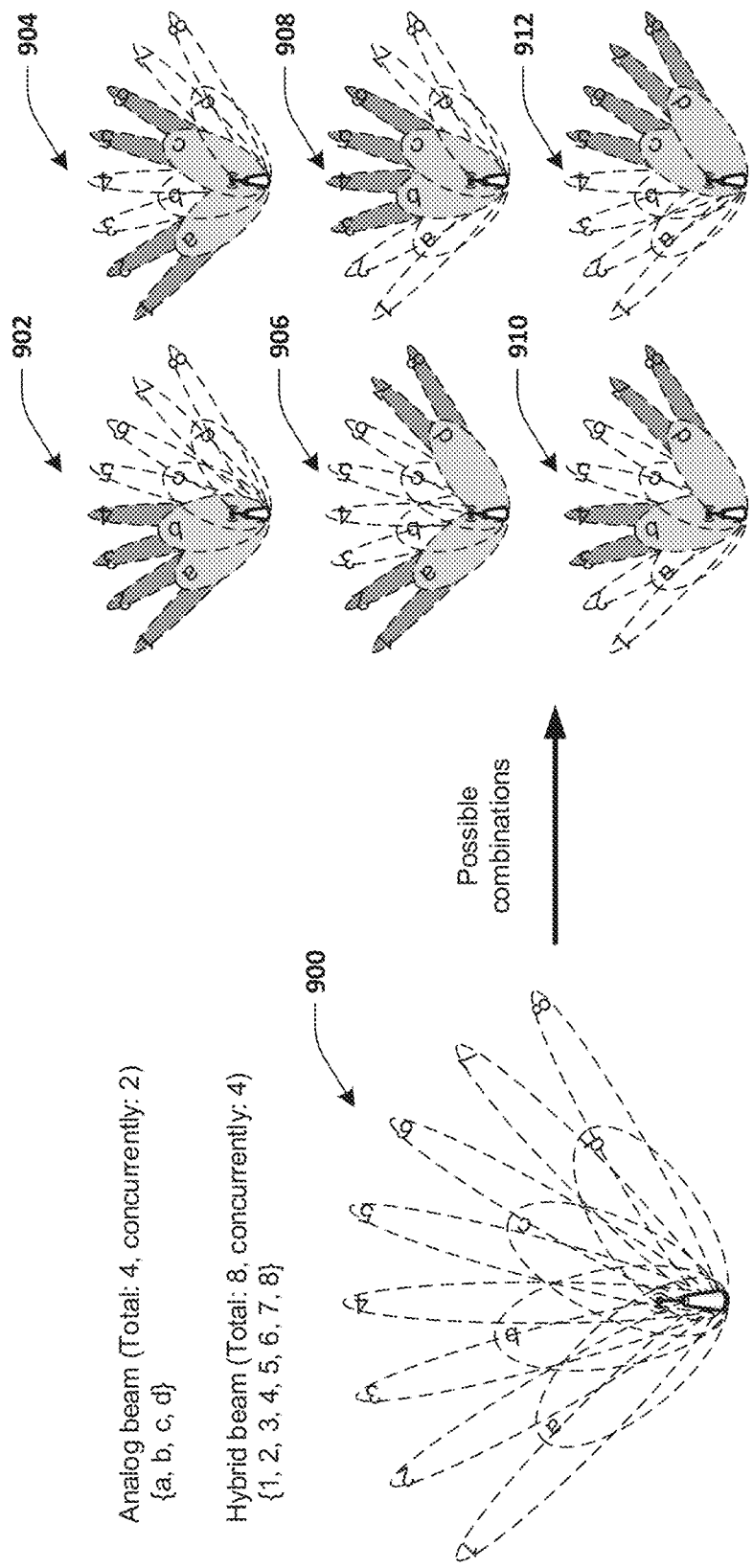
FIG. 9 is a diagram illustrating an example of one or more beamforming combinations generated by a node.

FIG. 9 illustrates exemplary beamforming combinations generated by a node. For example, the node may comprise a BS, a nodeB, an eNB, a gNB, a TRP, etc. For example, as illustrated by diagram 900, there may be four analog beam options (a, b, c, d) and/or eight hybrid beam options (1, 2, 3, 4, 5, 6, 7, 8) associated with the node. For example, each analog beam option of the four analog beam options may correspond to a direction of a beam. Alternatively and/or additionally, each hybrid beam option of the eight hybrid beam options may correspond to a direction of a beam.

However, the node may have capabilities to generate merely a limited number of analog beams and/or hybrid beams concurrently, such as two analog beams and/or four hybrid beams concurrently. For example, the node may generate a first combination of beams 902, a second combination of beams 904, a third combination of beams 906, a fourth combination of beams 908, a fifth combination of beams 910 and/or a sixth combination of beams 912. In some examples, beam sweeping may be performed by the node to perform communications in a plurality of directions associated with the four analog beam options and/or the eight hybrid beam options, sequentially.

Figure 10:
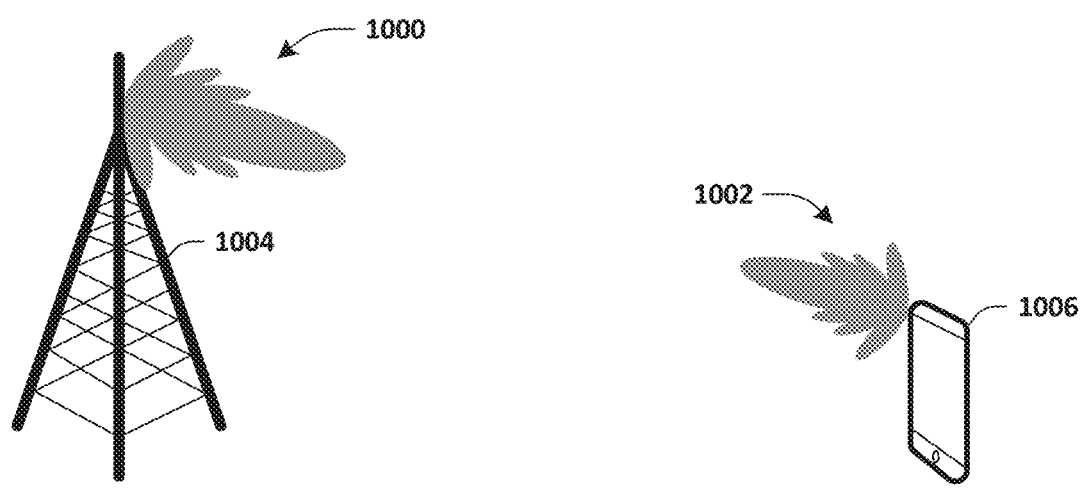
FIG. 10 is a component block diagram illustrating an example of beamforming and/or antenna gain.

FIG. 10 illustrates beamforming and/or antenna gain. For example, a serving node 1004 (e.g., a BS, a nodeB, an eNB, a gNB, a TRP, etc.) may exchange data with a UE 1006 using beamforming technology. For example, a first antenna gain associated with the serving node 1004 by beamforming using a first beam 1000 may be 15 to 30 decibels isotropic (dBi) (e.g., and/or a different value). Alternatively and/or additionally, a second antenna gain associated with the UE 1006 by beamforming using a second beam 1002 may be 3 to 20 dBi (e.g., and/or a different value). For example, beamforming may be performed with antenna gain when transmitting data and/or when receiving data (e.g., to mitigate path loss).

Figure 11:
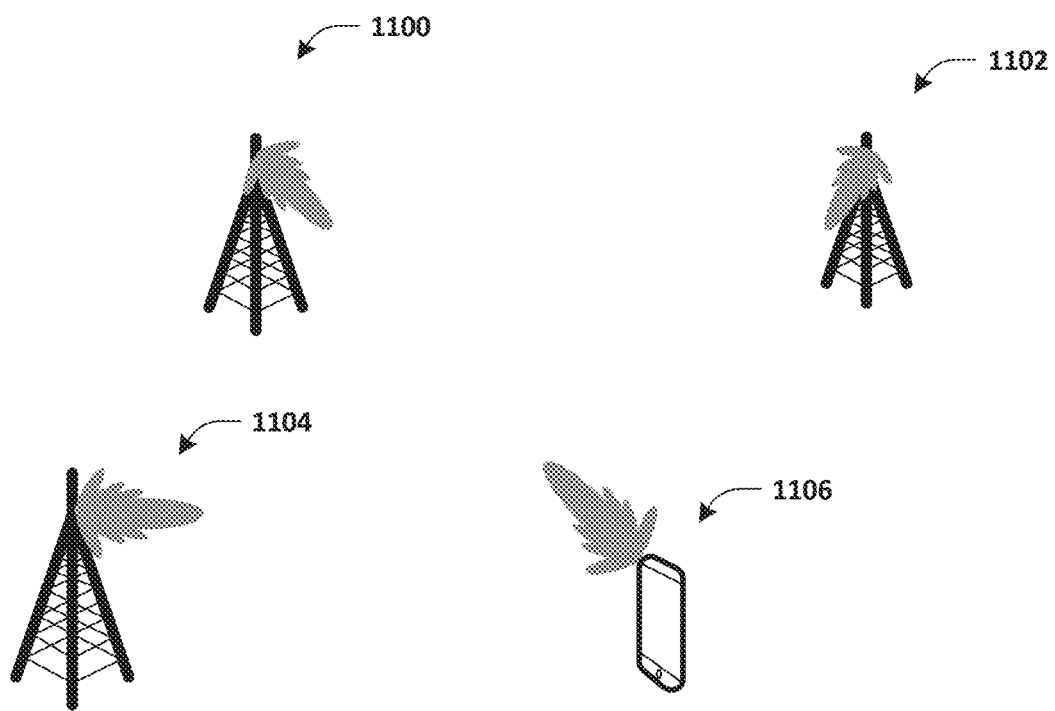
FIG. 11 is a component block diagram illustrating an example of beamforming and/or signal interference.

FIG. 11 illustrates beamforming and/or signal interference. For example, a serving node 1100 (e.g., a BS, a nodeB, an eNB, a gNB, a TRP, etc.) may exchange data with a UE 1106 using beamforming technology. For example, a first beam direction associated with the serving node 1100 may correspond to a second beam direction associated with the UE 1106 (in order to exchange data). For example, the first beam direction associated with the serving node 1100 may face a direction of the UE 1106 and/or the second beam direction associated with the UE 1106 may face a direction of the serving node 1100.

Alternatively and/or additionally, a first neighbor node 1102 and/or a second neighbor node 1104 may be communicating with other UEs (e.g., near the UE 1106). However, because the second beam direction associated with the UE 1106 is not facing the first neighbor node 1102 (and/or is not facing a third beam direction associated with the first neighbor node 1102) and/or the second beam direction associated with the UE 1106 is not facing the second neighbor node 1104 (and/or is not facing a fourth beam direction associated with the second neighbor node 1104), transmissions by the first neighbor node 1102 and/or the second neighbor node 1104 may not contribute to effective interference associated with the UE 1106 and/or the serving node 1100.

Figure 12A:
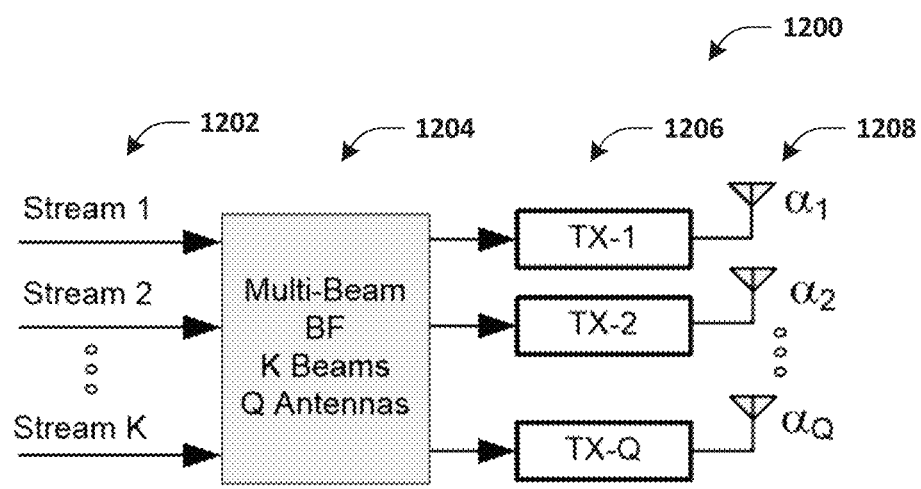
FIG. 12A is a component block diagram illustrating an exemplary digital beamforming device.

FIG. 12A illustrates an exemplary digital beamforming device 1200. For example, amplitude and/or phase variation may be applied to a plurality of data streams 1202 (e.g., K number of streams) after digital-analog conversion and/or digital down conversion is performed. For example, the plurality of data streams 1202 may be passed through a multi-beam beamformer 1204, a plurality of radio frequency (RF) chains 1206 (Q number of RF chains) and/or a plurality of antenna elements 1208 (e.g., Q number of antenna elements) to generate one or more beams (e.g., K number of beams).

Figure 12B:
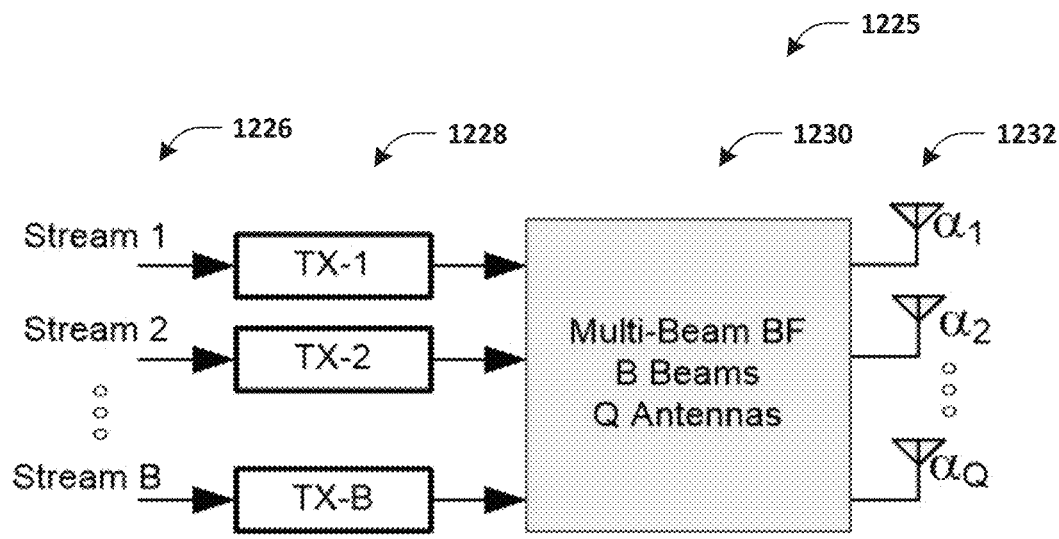
FIG. 12B is a component block diagram illustrating an exemplary analog beamforming device.

FIG. 12B illustrates an exemplary analog beamforming device 1225. For example, amplitude and/or phase variation may be applied to a plurality of data streams 1226. For example, the plurality of data streams 1226 may be passed through a plurality of RF chains 1228, a multi-beam beamformer 1230 and/or a plurality of antenna elements 1232 (e.g., q number of antenna elements) to generate one or more beams (e.g., B number of beams associated with B number of RF chains of the plurality of RF chains 1228).

Figure 12C:
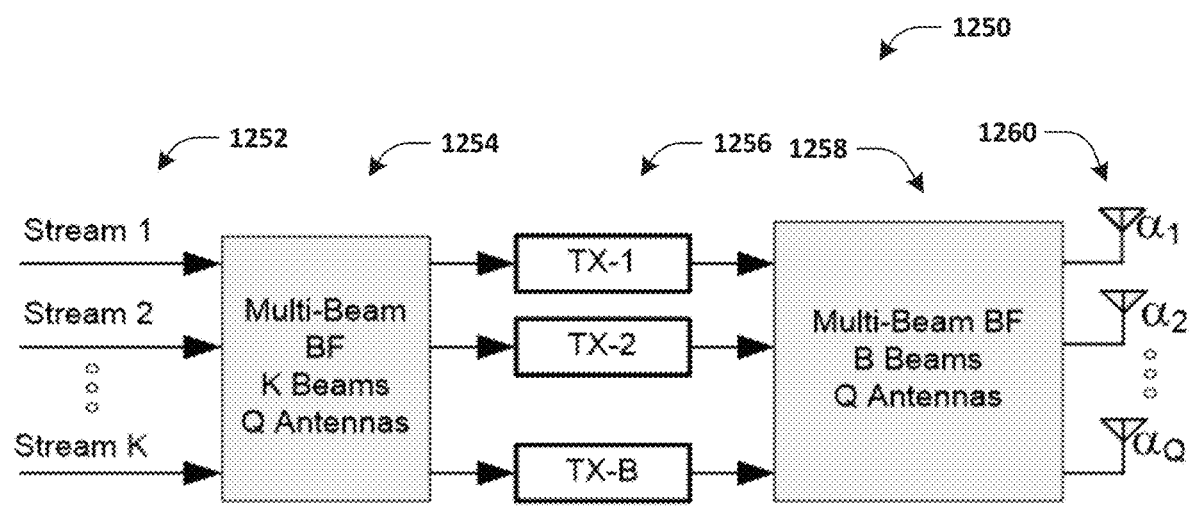
FIG. 12C is a component block diagram illustrating an exemplary fully connected hybrid beamforming device.

FIG. 12C illustrates an exemplary fully connected hybrid beamforming device 1250 (e.g., a full-array hybrid beamforming device). For example, hybrid beamforming may comprise one or more analog beamforming operations and/or one or more digital beamforming operations. For example, a plurality of data streams 1252 may be passed through a baseband beamformer 1254, a plurality of analog front end (AFE) RF chains 1256, an RF beamformer 1258 and/or a plurality of antenna elements 1260 to generate one or more beams (e.g., B number of beams associated with B number of AFE RF chains of the plurality of AFE RF chains 1256).

Figure 12D:
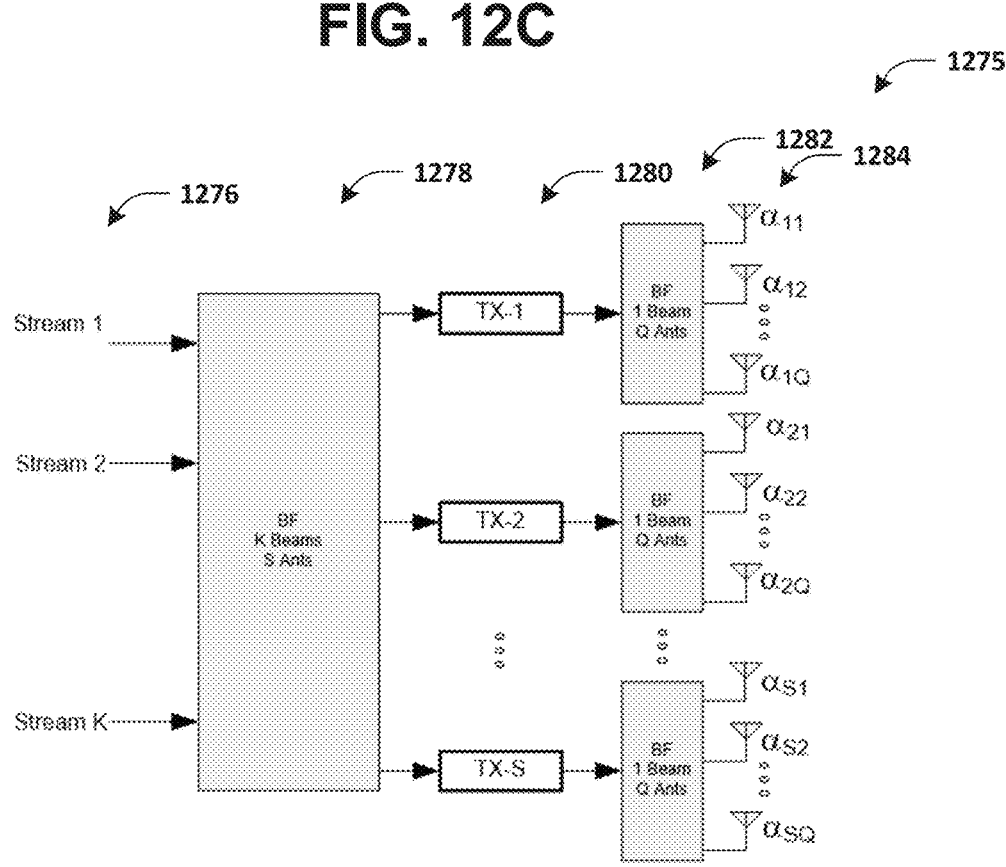
FIG. 12D is a component block diagram illustrating an exemplary partially connected hybrid beamforming device.

FIG. 12D illustrates an exemplary partially connected hybrid beamforming device 1275 (e.g., a sub-array hybrid beamforming device). For example, a plurality of data streams 1276 may be passed through a baseband beamformer 1278, a plurality of AFE RF chains 1280, a set of RF beamformers 1282 and/or a plurality of antenna elements 1284 to generate one or more beams (e.g., S number of beams associated with S number of AFE RF chains of the plurality of AFE RF chains 1280).

Figure 13:
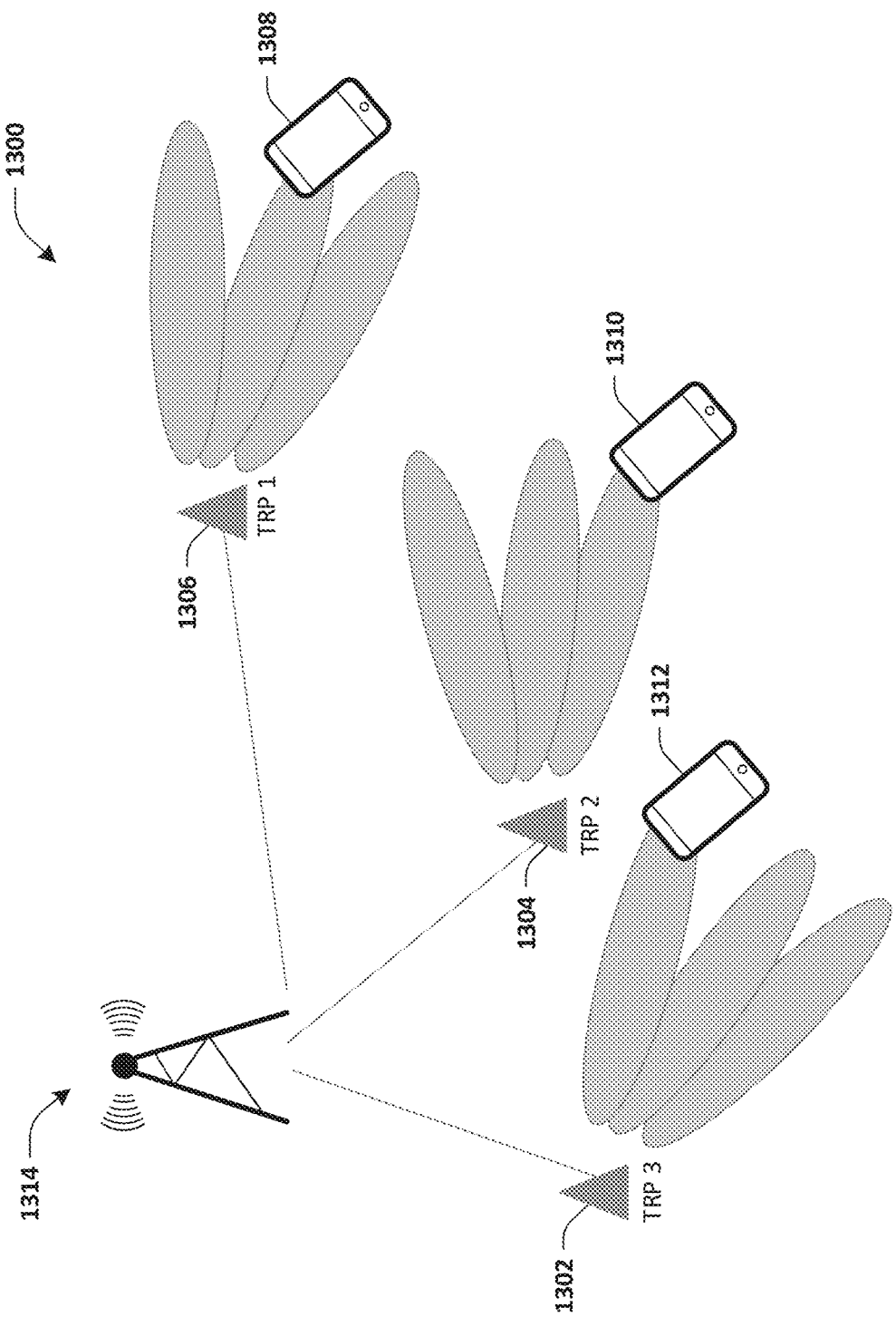
FIG. 13 is a component block diagram illustrating an example system comprising a set of transmission and reception points (TRP).

FIG. 13 illustrates an exemplary system 1300 comprising a set of TRPs performing beamforming. For example, the set of TRPs may comprise a first TRP 1306, a second TRP 1304 and/or a third TRP 1302. Alternatively and/or additionally, the set of TRPs may be controlled by a network node 1314 (e.g., a BS, a nodeB, an eNB, a gNB, a TRP, etc.). The first TRP 1306 may form a first plurality of beams. A first UE 1308 may exchange data with the first TRP 1306 via a first beam of the first plurality of beams. The first UE 1308 may also perform beamforming to exchange data with the first TRP 1306.

Alternatively and/or additionally, the second TRP 1304 may form a second plurality of beams. A second UE 1310 may exchange data with the second TRP 1304 via a second beam of the second plurality of beams. The second UE 1310 may also perform beamforming to exchange data with the second TRP 1304. Alternatively and/or additionally, the third TRP 1302 may form a third plurality of beams. A third UE 1312 may exchange data with the third TRP 1302 via a third beam of the third plurality of beams. The third UE 1312 may also perform beamforming to exchange data with the third TRP 1302.

Figure 14:
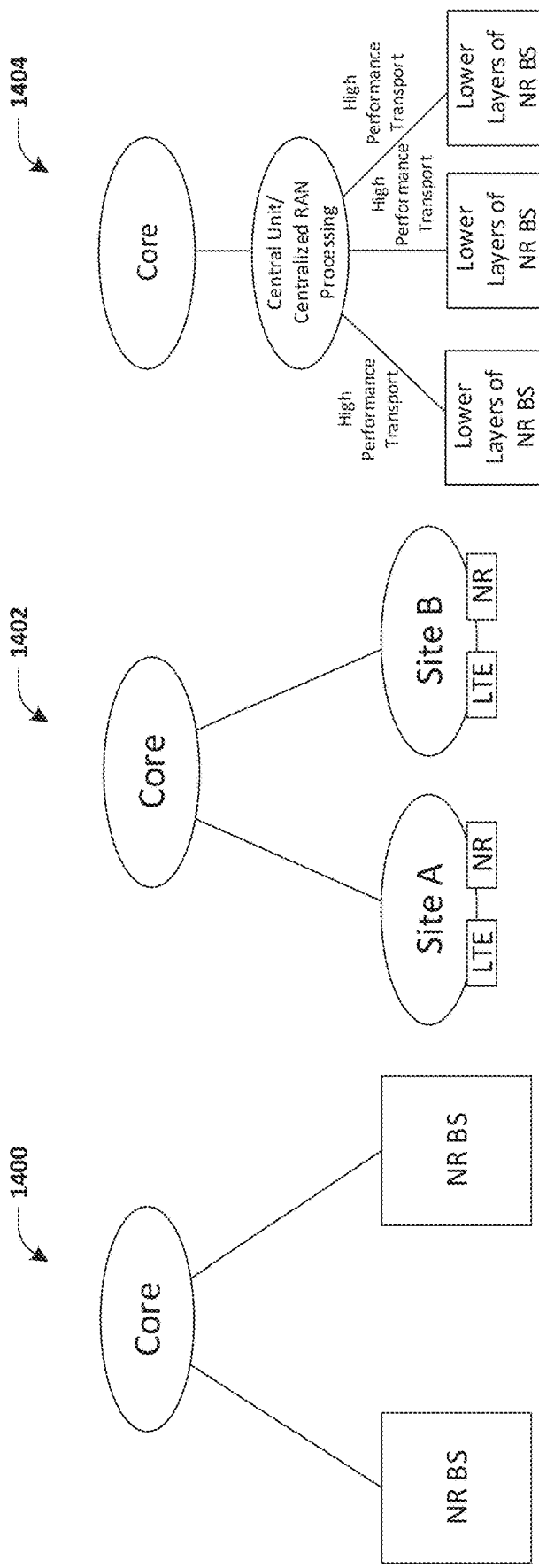
FIG. 14 is a diagram illustrating a first set of exemplary deployment scenarios.

FIG. 14 illustrates a first set of exemplary deployment scenarios associated with NR radio network architecture. For example, a first deployment scenario 1400 corresponds to a stand-alone deployment scenario. For example, the stand-alone deployment scenario may be applied in a macro deployment, an indoor hotspot environment, etc. Alternatively and/or additionally, a second deployment scenario 1402 corresponds to a co-sited deployment scenario. For example, each site has both NR functionality and LTE functionality. For example, each site may comprise a BS having NR functionality and a BS having LTE functionality. Alternatively and/or additionally, each site may comprise a BS having both NR functionality and LTE functionality.

Alternatively and/or additionally, a third deployment scenario 1404 corresponds to a centralized baseband deployment scenario. For example, remote radio units (e.g., lower layers of NR BS) may be connected over high performance transport (e.g., optical networks) to a centralized baseband unit (e.g., central unit/centralized radio access network (RAN) processing).

Figure 15:
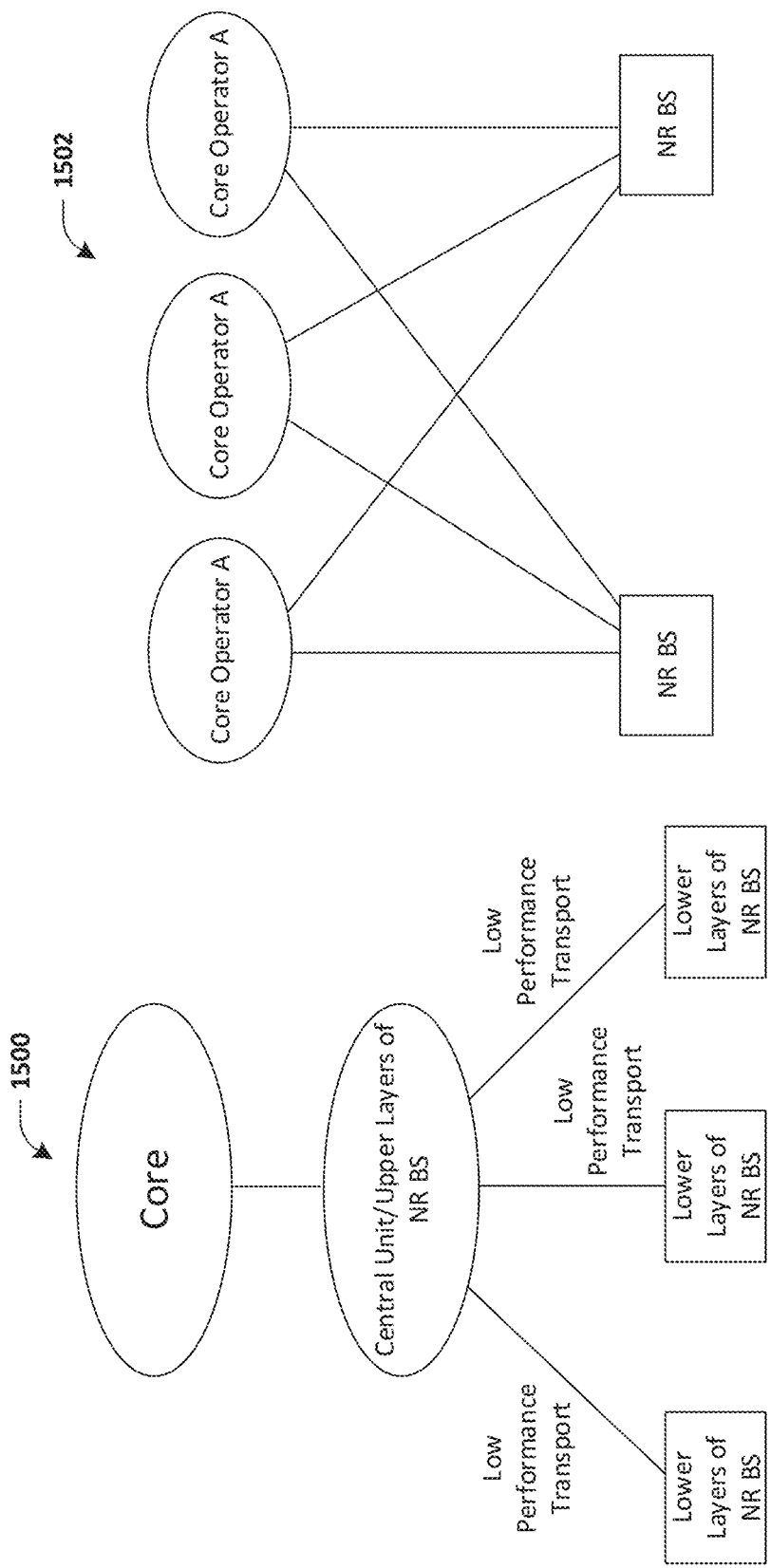
FIG. 15 is a diagram illustrating a second set of exemplary deployment scenarios.

FIG. 15 illustrates a second set of exemplary deployment scenarios associated with NR radio network architecture. For example, a fourth deployment scenario 1500 corresponds to a centralized baseband deployment scenario. For example, remote radio units (e.g., lower layers of NR BS) may be connected over low performance transport to a centralized unit (e.g., central unit/upper layers of NR BS). Alternatively and/or additionally, a fifth deployment scenario 1502 corresponds to a shared RAN deployment scenario.

Figure 16:
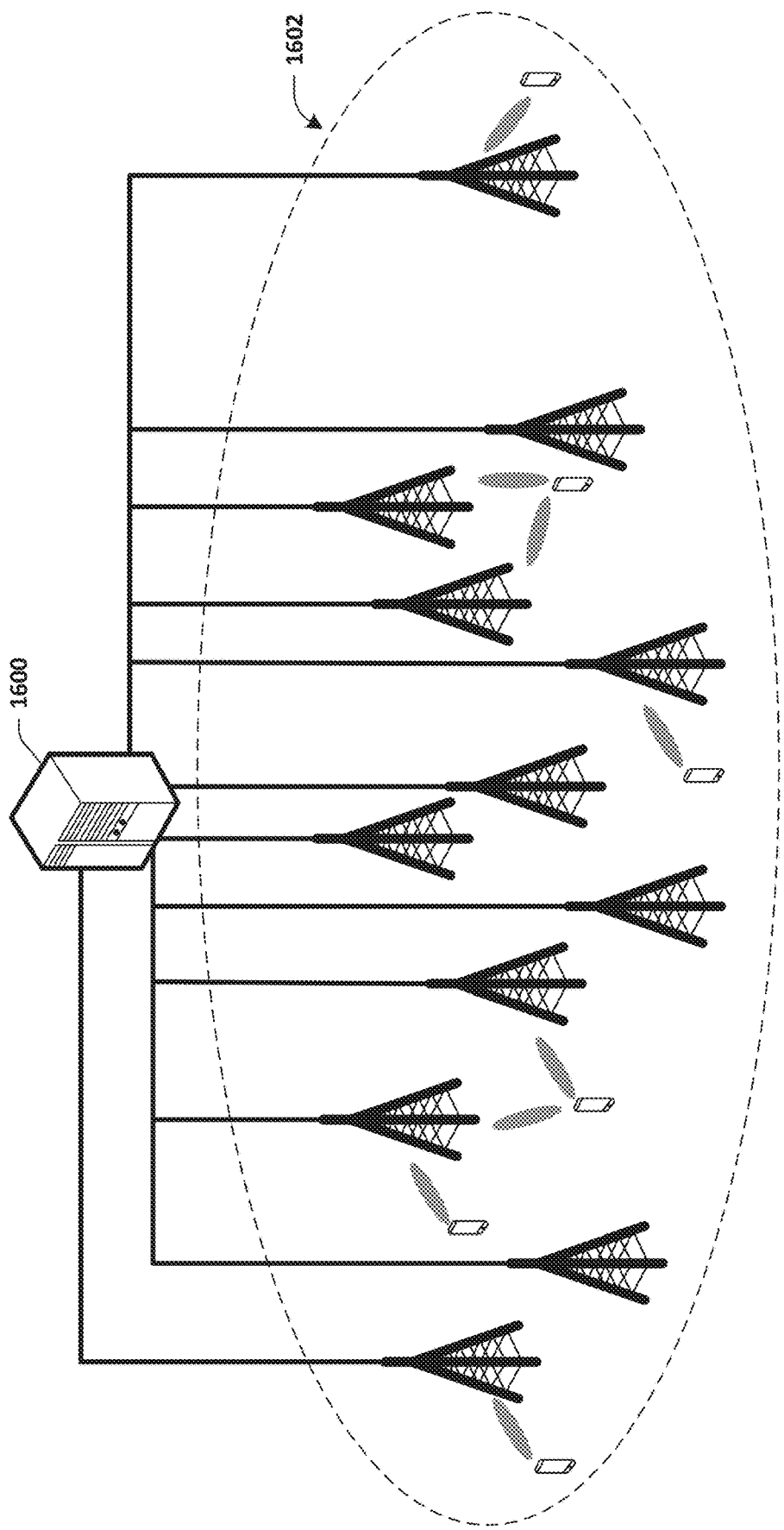
FIG. 16 is a component block diagram illustrating a network node controlling a cell.

FIG. 16 illustrates a network node 1600 (e.g., a BS, a nodeB, an eNB, a gNB, a TRP, etc.) controlling a cell 1602. For example, the cell 1602 may comprise a plurality of TRPs, which may be included in a TRPG. For example, network coverage associated with the cell 1602 may comprise network resources provided to each TRP of the plurality of TRPs (by the network node 1600). The plurality of TRPs may exchange data with a plurality of UEs.

Figure 17:
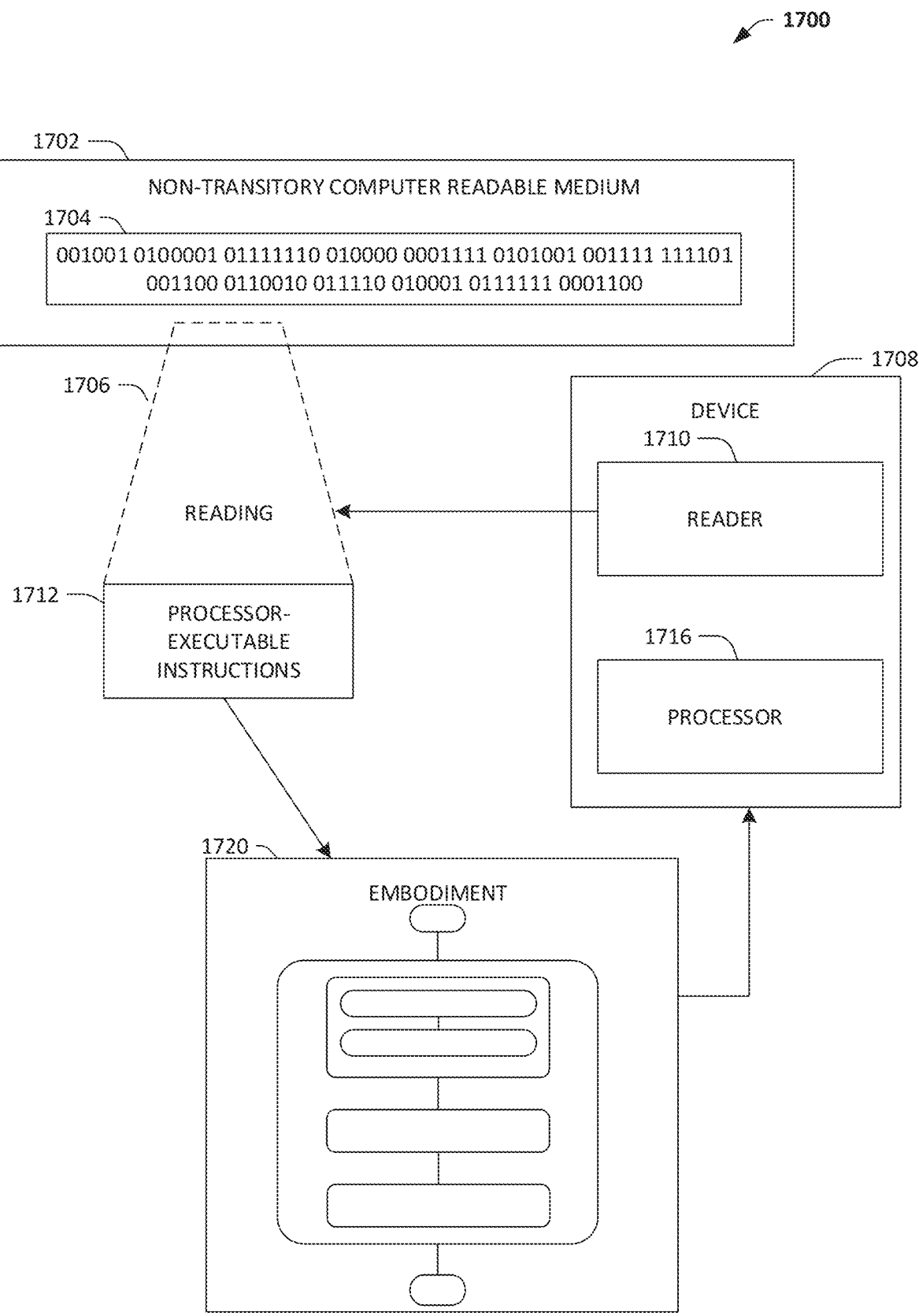
FIG. 17 is an illustration of a scenario featuring an example non-transitory computer readable medium in accordance with one or more of the provisions set forth herein.

FIG. 17 is an illustration of a scenario 1700 involving an example non-transitory computer readable medium 1702. The non-transitory computer readable medium 1702 may comprise processor-executable instructions 1712 that when executed by a processor 1716 cause performance (e.g., by the processor 1716) of at least some of the provisions herein. The non-transitory computer readable medium 1702 may comprise a memory semiconductor (e.g., a semiconductor utilizing static random access memory (SRAM), dynamic random access memory (DRAM), and/or synchronous dynamic random access memory (SDRAM) technologies), a platter of a hard disk drives, a flash memory device, or a magnetic or optical disc (such as a compact disc (CD), digital versatile disc (DVD), and/or floppy disk). The example non-transitory computer readable medium 1702 stores computer-readable data 1704 that, when subjected to reading 1706 by a reader 1710 of a device 1708 (e.g., a read head of a hard disk drive, or a read operation invoked on a solid-state storage device), express the processor-executable instructions 1712. In some embodiments, the processor-executable instructions 1712, when executed, cause performance of operations, such as at least some of the example method 700 of FIG. 7A, and/or the example method 750 of FIG. 7B, for example. In some embodiments, the processor-executable instructions 1712 are configured to cause implementation of a system and/or scenario, such as at least some of the example system 800 of FIG. 8, the example system of FIG. 9, the example system of FIG. 10, the example system of FIG. 11, the example system of FIG. 12A, the example system of FIG. 12B, the example system of FIG. 12C, the example system of FIG. 12C, the example system of FIG. 12D, the example system 1300 of FIG. 13, the example system of FIG. 14, the example system of FIG. 15, and/or the example system of FIG. 16, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers (e.g., nodes(s)).

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer (e.g., node) to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments and/or examples are provided herein. The order in which some or all of the operations are described herein should not be construed as to imply that these operations are necessarily order dependent. Alternative ordering will be appreciated by one skilled in the art having the benefit of this description. Further, it will be understood that not all operations are necessarily present in each embodiment and/or example provided herein. Also, it will be understood that not all operations are necessary in some embodiments and/or examples.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method for a user equipment (UE), comprising:
at least one of receiving or monitoring a first control region via a first link, wherein the first control region is associated with a first configuration,
wherein the first control region is a control resource set (CORESET) configured for monitoring downlink control information,
wherein the downlink control information is indicative of at least one of one or more downlink assignments or one or more uplink grants;
determining a link failure associated with the first link;
responsive to determining the link failure, transmitting a failure recovery request;

responsive to transmitting the failure recovery request, at least one of receiving or monitoring a second control region via a second link,
wherein the second control region is associated with a second configuration;
receiving a response in the second control region; and
responsive to or after receiving the response, at least one of receiving or monitoring the second control region.

2. The method of claim 1, wherein:
the first configuration comprises a spatial parameter indicative of quasi-co-location (QCL) associated with the first link.

3. The method of claim 1, comprising:
responsive to or after receiving the response, at least one of receiving or monitoring, via the second link, at least one of one or more second downlink assignments, one or more second uplink grants or one or more downlink transmissions, on a second set of time domain resources and/or a second set of frequency domain resources of the second control region.

4. The method of claim 1, wherein:
responsive to or after receiving the response, at least one of receiving or monitoring at least one of one or more second downlink assignments, one or more second uplink grants or one or more downlink transmissions on a first set of time domain resources and/or a first set of frequency domain resources of the first control region and/or a second set of time domain resources and/or a second set of frequency domain resources of the second control region.

5. The method of claim 1, comprising:
receiving a reconfiguration message indicative of a third configuration; and
responsive to or after receiving the reconfiguration message, at least one of receiving or monitoring a control region, associated with the third configuration.

6. The method of claim 1, comprising:
responsive to or after receiving the response, at least one of discarding or ignoring a spatial parameter, indicative of QCL associated with the first link in the first configuration.

7. The method of claim 1, wherein:
the second control region is a control resource set (CORESET) configured for monitoring the response responsive to or after transmitting the failure recovery request.

8. The method of claim 1, wherein:
responsive to or after receiving the response, at least one of receiving or monitoring, via the second link, at least one of one or more second downlink assignments, one or more second uplink grants or one or more downlink transmissions on a first set of time domain resources and/or a first set of frequency domain resources of the first control region and/or a second set of time domain resources and/or a second set of frequency domain resources of the second control region.

9. The method of claim 1, the determining the link failure comprising:
determining that one or more qualities of one or more control channels associated with the first link are below a quality threshold.

10. The method of claim 1, comprising:
identifying a candidate beam based upon a measurement of a downlink reference signal, wherein the failure recovery request is indicative of the downlink reference signal.

11. The method of claim 10, wherein:
the second link comprises the candidate beam spatially quasi-co-located with the downlink reference signal.

12. A method for a network node, comprising:
transmitting downlink control information in a first control region via a first link to a user equipment (UE), wherein the first control region is associated with a first configuration,
wherein the first control region is a control resource set (CORESET) configured for transmitting the downlink control information,
wherein the downlink control information is indicative of at least one of one or more downlink assignments or one or more uplink grants;
receiving a failure recovery request, indicative of a link failure associated with the first link, transmitted by the UE;
responsive to receiving the failure recovery request, transmitting a response in a second control region via a second link to the UE,
wherein the second control region is associated with a second configuration; and
responsive to or after transmitting the response, transmitting one or more downlink transmissions in the second control region.

13. The method of claim 12, wherein:
the first configuration comprises a spatial parameter indicative of QCL associated with the first link.

14. The method of claim 12, comprising:
responsive to or after transmitting the response, transmitting at least one of one or more second downlink assignments, one or more second uplink grants or one or more downlink transmissions to the UE via the second link, on a second set of time domain resources and/or a second set of frequency domain resources of the second control region.

15. The method of claim 12, wherein:
responsive to or after transmitting the response, transmitting at least one of one or more second downlink assignments, one or more second uplink grants or one or more downlink transmissions to the UE on a first set of time domain resources and/or a first set of frequency domain resources of the first control region and/or a second set of time domain resources and/or a second set of frequency domain resources of the second control region.

16. The method of claim 12, comprising:
transmitting a reconfiguration message, indicative of a third configuration, to the UE; and
transmitting one or more downlink transmissions in a control region, associated with the third configuration, to the UE.

17. The method of claim 12, wherein:
the second control region is a CORESET configured for transmitting the response responsive to or after receiving the failure recovery request.

18. The method of claim 12, comprising:
identifying a downlink reference signal indicated via the failure recovery request, wherein the second link comprises a candidate beam spatially quasi-co-located with the downlink reference signal.

19. A communication device, comprising:
a processor; and
memory comprising processor-executable instructions that when executed by the processor cause performance of operations, the operations comprising:

at least one of receiving or monitoring a first control region via a first link, wherein the first control region is associated with a first configuration,
wherein the first control region is a control resource set (CORESET) configured for monitoring downlink control information,
wherein the downlink control information is indicative of at least one of one or more downlink assignments or one or more uplink grants;
determining a link failure associated with the first link;
responsive to determining the link failure, transmitting a failure recovery request;
responsive to transmitting the failure recovery request, at least one of receiving or monitoring a second control region via a second link,
wherein the second control region is associated with a second configuration;
receiving a response in the second control region; and
responsive to or after receiving the response, at least one of receiving or monitoring the second control region.

\* \* \* \* \*